(12) United States Patent
Mankowski et al.

(10) Patent No.: US 12,384,026 B1
(45) Date of Patent: Aug. 12, 2025

(54) MACHINE-LEARNING-ENABLED TOOL CHANGER FOR MUSHROOM CROP MANAGEMENT SYSTEM

(71) Applicant: 4AG Robotics Inc., Salmon Arm (CA)

(72) Inventors: Peter Mankowski, Vernon (CA); Vijaya Sankar Velayudham Jayashree, Salmon Arm (CA); Nathan Tomlinson, Enderby (CA)

(73) Assignee: 4AG Robotics Inc., Salmon Arm (CA)

( * ) Notice: Subject to any disclaimer, the term of this patent is extended or adjusted under 35 U.S.C. 154(b) by 0 days.

(21) Appl. No.: 18/904,925

(22) Filed: Oct. 2, 2024

Related U.S. Application Data

(60) Provisional application No. 63/551,215, filed on Feb. 8, 2024.

(51) Int. Cl.
*B25J 9/16* (2006.01)
*A01G 18/69* (2018.01)
(Continued)

(52) U.S. Cl.
CPC .............. *B25J 9/161* (2013.01); *A01G 18/69* (2018.02); *A01G 18/70* (2018.02); *B25J 9/1697* (2013.01);
(Continued)

(58) Field of Classification Search
None
See application file for complete search history.

(56) References Cited

U.S. PATENT DOCUMENTS

| | | | |
|---|---|---|---|
| 2,853,333 A | 9/1958 | Littell | |
| 2,940,713 A | 6/1960 | Dusen | |

(Continued)

FOREIGN PATENT DOCUMENTS

| | | | |
|---|---|---|---|
| CA | 2041824 A1 | 11/1991 | |
| CA | 3111952 A1 * | 9/2022 | |

(Continued)

OTHER PUBLICATIONS

ATI Industrial Automation, Reliability, Safety, and Strength Realized in ATI's New Patent: Innovative Robotic Tool Changer Design, Sep. 2024, Retrieved from the Internet: <URL:https://www.ati-ia.com/company/NewsArticle.aspx?id=700132592>, 2 pages.

(Continued)

*Primary Examiner* — Thomas E Worden
*Assistant Examiner* — Bryant Tang
(74) *Attorney, Agent, or Firm* — McKee, Voorhees & Sease, PLC

(57) ABSTRACT

A robotic mushroom crop manager periodically or continuously receives mushroom bed data corresponding to a mushroom bed including growing mushrooms at a plurality of times. A trained mushroom bed model is used to process the mushroom bed data to generate mushroom bed state vectors respectively characterizing corresponding states of the mushroom bed at the plurality of times. Crop management equipment is controlled to perform a crop management program comprising a sequence of actions to be performed by crop management equipment comprising, for each current action in the sequence of actions, selecting, based on corresponding a current mushroom bed state vector, a selected crop management tool from a plurality of crop management tools. The crop management equipment is controlled to use the selected crop management tool to perform the current action on the mushroom bed.

17 Claims, 8 Drawing Sheets

(51) Int. Cl.
    *A01G 18/70*     (2018.01)
    *B25J 15/04*     (2006.01)
    *B25J 15/06*     (2006.01)
    *G06Q 50/02*     (2012.01)

(52) U.S. Cl.
    CPC .............. *B25J 15/04* (2013.01); *G06Q 50/02* (2013.01); *B25J 15/0616* (2013.01)

(56) References Cited

U.S. PATENT DOCUMENTS

| | | |
|---|---|---|
| 3,183,640 A | 5/1965 | Eugene et al. |
| 3,537,495 A | 11/1970 | Pearson |
| 3,568,959 A | 3/1971 | Blaff |
| 3,635,005 A | 1/1972 | Persson |
| 3,765,408 A | 10/1973 | Kawai |
| 4,453,755 A | 6/1984 | Blatt et al. |
| 4,472,929 A | 9/1984 | Maccanna et al. |
| 4,519,193 A | 5/1985 | Yoshida et al. |
| 4,545,186 A | 10/1985 | Maccanna |
| 4,600,229 A | 7/1986 | Oten |
| 4,768,919 A | 9/1988 | Borgman et al. |
| 4,828,306 A | 5/1989 | Blatt |
| 4,852,926 A | 8/1989 | Littell |
| 4,883,939 A | 11/1989 | Sagi |
| 4,975,016 A | 12/1990 | Pellenc et al. |
| 5,035,109 A | 7/1991 | van den Top |
| 5,058,368 A | 10/1991 | Wheeler |
| 5,185,989 A | 2/1993 | Russell et al. |
| 5,201,560 A | 4/1993 | Golden |
| 5,234,375 A | 8/1993 | Hendriks |
| 5,344,202 A | 9/1994 | Ramler et al. |
| 5,471,827 A | 12/1995 | Janssen et al. |
| 5,491,965 A | 2/1996 | Wheeler et al. |
| 5,935,136 A | 8/1999 | Hulse et al. |
| 7,185,603 B2 | 3/2007 | Correa et al. |
| 7,204,792 B2 | 4/2007 | Hagihara et al. |
| 7,207,609 B2 | 4/2007 | Ilich |
| 7,280,890 B2 | 10/2007 | Seemann |
| 7,281,739 B2 | 10/2007 | Kniss |
| 7,309,089 B2 | 12/2007 | Perlman et al. |
| 7,665,783 B2 | 2/2010 | Nishio |
| 7,854,108 B2 | 12/2010 | Koselka et al. |
| 8,005,570 B2 | 8/2011 | Gloden et al. |
| 8,033,087 B2 | 10/2011 | Rapila et al. |
| 9,527,115 B2 | 12/2016 | Larose et al. |
| 9,623,570 B1 | 4/2017 | Krahn et al. |
| 9,730,394 B2 | 8/2017 | Van De Vegte et al. |
| 9,974,235 B2 | 5/2018 | Van De Vegte et al. |
| 10,654,177 B2 | 5/2020 | Perlman et al. |
| 10,674,666 B2 | 6/2020 | Moore |
| 10,681,905 B2 | 6/2020 | Tanner et al. |
| 10,785,912 B2 | 9/2020 | Moore |
| 10,814,498 B2 | 10/2020 | Wagner et al. |
| 10,850,402 B2 | 12/2020 | Wagner et al. |
| 11,154,010 B2 * | 10/2021 | Good ........................ B25J 9/026 |
| 11,889,789 B2 | 2/2024 | Glibetic et al. |
| 2005/0268587 A1 | 12/2005 | Mckeown |
| 2009/0188771 A1 | 7/2009 | Van Den Top |
| 2009/0320430 A1 * | 12/2009 | Rapila ..................... A01G 18/70 56/194 |
| 2012/0210553 A1 | 8/2012 | Chen |
| 2012/0279122 A1 | 11/2012 | Benne et al. |
| 2013/0115028 A1 | 5/2013 | Kremerman et al. |
| 2013/0147101 A1 | 6/2013 | Cho |
| 2013/0149076 A1 | 6/2013 | Cox et al. |
| 2013/0272823 A1 | 10/2013 | Hudgens et al. |
| 2013/0340329 A1 | 12/2013 | Van Den Top |
| 2014/0064886 A1 | 3/2014 | Toshima |
| 2019/0240813 A1 | 8/2019 | Nakayama et al. |
| 2021/0082104 A1 * | 3/2021 | Kashkoush ............... G06T 7/97 |
| 2023/0044563 A1 | 2/2023 | Boudreau et al. |
| 2023/0081119 A1 * | 3/2023 | Rohanimanesh ........ B25J 15/04 700/250 |
| 2023/0150764 A1 | 5/2023 | Ruehr |
| 2023/0255153 A1 | 8/2023 | Counne |
| 2024/0324524 A1 | 10/2024 | Al-Diri et al. |

FOREIGN PATENT DOCUMENTS

| | | |
|---|---|---|
| CN | 107046933 A | 8/2017 |
| CN | 109081036 A | 12/2018 |
| CN | 108812086 B | 5/2020 |
| CN | 113079954 A | 7/2021 |
| DE | 10335021 B3 | 11/2004 |
| EP | 0596189 A1 | 5/1994 |
| EP | 3081071 A1 | 10/2016 |
| GB | 1336393 A | 11/1973 |
| JP | H0787829 A | 4/1995 |
| JP | H0957213 A | 3/1997 |
| JP | 6300571 B2 | 3/2018 |
| KR | 100926534 B1 | 11/2009 |
| KR | 20210014268 A | 2/2021 |
| KR | 20210035948 A | 4/2021 |
| NL | 8600887 A | 11/1987 |
| WO | 9111902 A1 | 8/1991 |
| WO | 2016171556 A1 | 10/2016 |
| WO | 2020021643 A1 | 1/2020 |
| WO | 2020191483 A1 | 10/2020 |
| WO | 2022243260 A1 | 11/2022 |
| WO | 2023010198 A1 | 2/2023 |

OTHER PUBLICATIONS

Azoyan, "Feasibility Analysis of an Automated Mushroom Harvesting System," Thesis, 2004, 69 pages.
Ctich, Centro Tecnológico de Investigación del Champiñones Rioja, Mushroom Technological Research Center of La Rioja (CTICH), Web page (English version), 6 pages.
European Commission, "Fully Automatic System for Picking and Handling Mushrooms for the Fresh Market: From the Growing Bed to the Cooling Storage," Final Report Summary, End date: Aug. 31, 2013, Retrieved from the Internet: <URL:https://cordis.europa.eu/project/id/262037/reporting>, 5 pages.
Galley et al., "Pneumatic Hyperelastic Robotic End-Effector for Grasping Soft Curved Organic Objects," Electronic Thesis and Dissertation Repository, Aug. 15, 2019, 143 pages.
International Preliminary Report on Patentability in PCT/CA2021/000057, mailed Feb. 15, 2024, 9 pages.
International Search Report and Written Opinion in PCT/CA2021/000057, mailed Apr. 25, 2022, 12 pages.
Non-Final Office Action in U.S. Appl. No. 18/512,597, mailed Aug. 7, 2024, 13 pages.
Notice of Allowance in U.S. Appl. No. 18/512,597, mailed Sep. 11, 2024, 8 pages.
Patent Examination Report 1 in NZ808264, mailed Mar. 5, 2024, 3 pages.
Patent Examination Report 1 in NZ813080, mailed Aug. 28, 2024, 3 pages.
Reed et al., "AE—Automation and Emerging Technologies: Automatic Mushroom Harvester Development," Journal of Agricultural Engineering Research, Jan. 2001, vol. 78, No. 1, pp. 15-23.
Screen Capture from YouTube Video Clip Entitled "Champi-ON Demo Video," 2 pages, uploaded on Sep. 17, 2013 by user Champi-ON Project Project, Retrieved from the Internet: <URL:https://youtu.be/y44MyQ39d00>, 2 pages.
Techbrew, "Changing the Mushroom Harvesting Business," made public by TechBrew Robotics on Apr. 21, 2021 (date verified by Google Wayback Machine), Retrieved from the Internet: <URL: https://web.archive.org/web/20210421150750/https://techbrew.com/mushroom-harvesting-roboV,>, 2 pages.
European Patent Application No. 21095213.5, Extended European Search Report dated Nov. 13, 2024.
International Patent Application No. PCT/CA2024/051175, International Search Report and Written Opinion, dated Nov. 8, 2024.
International Patent Application No. PCT/CA2024/051246, International Search Report and Written Opinion, dated Dec. 17, 2024.

(56) References Cited

OTHER PUBLICATIONS

U.S. Appl. No. 18/512,597, Notice of Allowance dated Dec. 4, 2024.
U.S. Appl. No. 18/512,597, Notice of Allowance dated Nov. 7, 2024.
International Patent Application No. PCT/CA2024/051244, International Search Report and Written Opinion, dated Feb. 3, 2025.
U.S. Appl. No. 18/512,597, Corrected Notice of Allowance dated Feb. 13, 2025.
U.S. Appl. No. 18/512,597, Notice of Allowance dated Jan. 23, 2025.
European Patent Application No. 24208796.3, Extended European Search Report dated Apr. 15, 2025.
European Patent Application No. 24209254.0, Extended European Search Report dated Apr. 15, 2025.
U.S. Appl. No. 18/957,448, Notice of Allowance dated Mar. 5, 2025.
European Patent Application No. 24208682.5, Extended European Search Report dated May 14, 2025.

* cited by examiner

MACHINE-LEARNING-ENABLED TOOL CHANGER FOR MUSHROOM CROP MANAGEMENT SYSTEM

FIELD

The present disclosure relates generally to techniques for the cultivation and harvest of agricultural crops, and in particular for the automated cultivation and harvest of mushrooms.

BACKGROUND

In typical commercial mushroom growing operations, mushrooms are grown in growing beds on the surface of casing soil over substrate in a series of weekly intervals called flushes. Each flush is picked several times per day over a five-day period, and typically two to three flushes are harvested. The size at which the mushrooms are picked depends on market requirements.

European and North American commercial production of button mushrooms typically occurs on "Dutch Style" substrate filled shelves, using a two or three flush cropping cycle. The substrate is typically a composted mixture of wheat straw, animal manure, and gypsum. The substrate is pasteurized, inoculated, and colonized with spawn of a selected mushroom strain. The substrate is covered with a casing soil of peat and lime mixture in a layer approximately 45 to 50 mm deep, which is then ruffled with compost added to the casing to mix mushroom mycelium into the casing.

Traditionally, commercial mushroom farm operations rely on manual labour to harvest the mushrooms. Manual labour is costly, however, and difficult to optimize. Mushrooms typically grow at such a rate that the mushrooms approximately double in size every 24 hours. Using manual labour, each flush is picked only two or three times per day for the duration of the flush, meaning that a mushroom bed may become overgrown between pickings due to the growth rate of mushrooms, or that the growth of some mushrooms may be negatively impacted due to the build-up of $CO_2$ beneath the surface. In order to prevent overgrowth of a mushroom bed, a flush can be picked more frequently, but picking at a higher frequency is difficult and costly to accomplish with manual labour. When a bed becomes overgrown, the mushrooms may run out of room and grow into each other, thereby reducing yield, increasing stem growth, and/or causing deformation of each individual mushroom thereby adversely affecting the quality and value of the harvested mushrooms.

The automated mushroom harvesting apparatus and system by Bourdeau et al. disclosed in WIPO International Publication Number WO 2023/010198 A1 solves many of the challenges associated with the automated picking of cultivated mushrooms. The system includes a tool change and cleaning station comprising a tool rack having a plurality of slots for supporting a plurality of end effectors. The plurality of end effectors includes end effectors of different sizes for harvesting different sizes of mushrooms.

There remains, however, a need for improved techniques to optimize the total yield and overall effectiveness of automated mushroom cultivation and harvest systems which addresses at least some of the shortcomings of previous solutions and provides yet further advantages, thereby providing a material value over prior techniques.

BRIEF DESCRIPTION OF THE DRAWINGS

Embodiments will now be described, by way of example only, with reference to the attached Figures.

Figure 1:
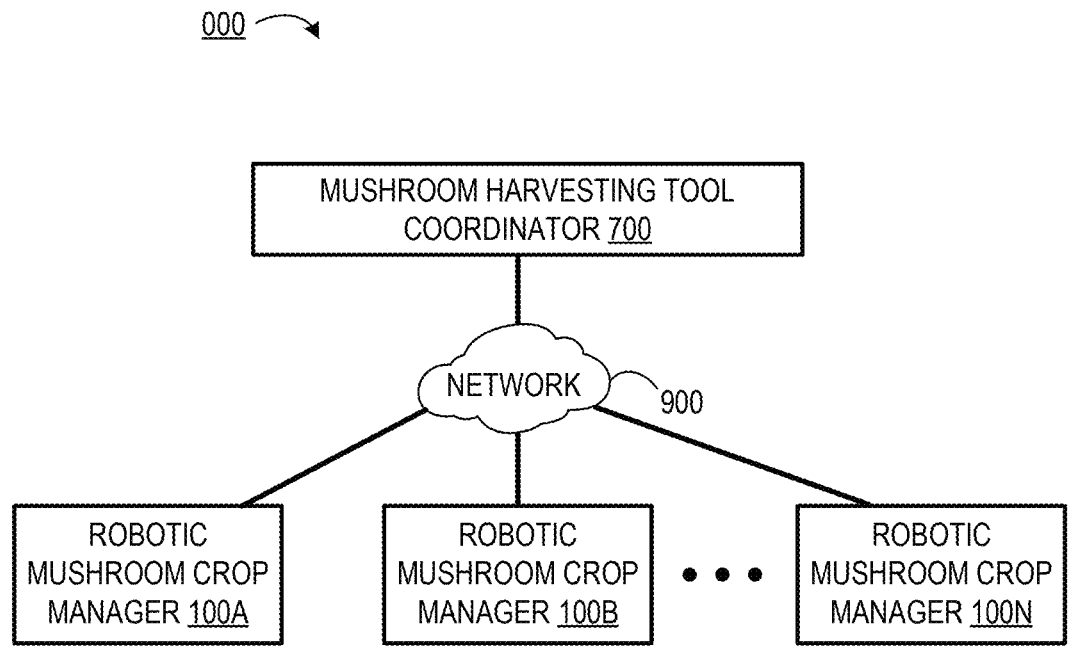
FIG. 1 is a block diagram of an automated mushroom crop management system.

It is to be understood that the accompanying drawings are used for illustrating the principles of the embodiments and exemplifications of the subject-matter discussed herein. Hence the drawings are illustrated for simplicity and clarity, and not necessarily drawn to scale and are not intended to be limiting in scope. Reference characters/numbers are used to depict the elements of the subject-matter discussed that are also shown in the drawings. The same corresponding reference characters/numbers are given to a corresponding component or components of the same or similar nature, which may be depicted in multiple drawings for clarity. In particular, specific embodiments or categories of embodiments of an element designated by a particular reference character may be distinguished by means of a suffix, wherein the specific embodiment designated by a reference character having a suffix is a species of the more general element having the same reference character lacking the suffix. For example, an element shown in the drawings and designated by the reference character ###n is a species of the more general element designated by reference character ###, and thus possesses all of the features of the more general element. Text may also be included in the drawings to further clarify certain principles or elements of the invention. It should be noted that features depicted by one drawing may be used in conjunction with or within other drawings or substitute features of other drawings. It should further be noted that common and well-understood elements for creating a commercially viable version of the embodiments discussed herein are often not depicted to facilitate a better view of the principles and elements of the subject-matter discussed herein. Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DESCRIPTION

Improved techniques for automated cultivation and harvest of mushrooms are disclosed herein. More particularly, improved techniques for automated selection of crop management tools by robotic mushroom crop managers are disclosed herein. The techniques include a robotic mushroom crop manager operative to generate a machine-learning-based model based on previous actions performed on a mushroom bed using tools selected from a plurality of tools, and to continuously or periodically train the model based on mushroom bed data collected while the robotic mushroom crop manager performs a crop management program. The techniques also include an automated crop management tool selection system including a plurality of like robotic mushroom crop managers communicatively coupled with a mushroom crop management tool coordinator operative to generate a machine-learning-based model based on previous actions performed on a plurality of mushroom beds by the plurality of like robotic mushroom crop managers using tools selected from a like plurality of tools, and to continuously or periodically train the model based on mushroom bed data collected while the robotic mushroom crop managers perform respective crop management programs.

With reference to FIG. 1, an automated mushroom crop management system 000 may have a plurality of robotic mushroom crop managers 100A, 100B . . . 100N communicatively coupled with a mushroom crop management tool coordinator 700 via a network 900.

Figure 2:
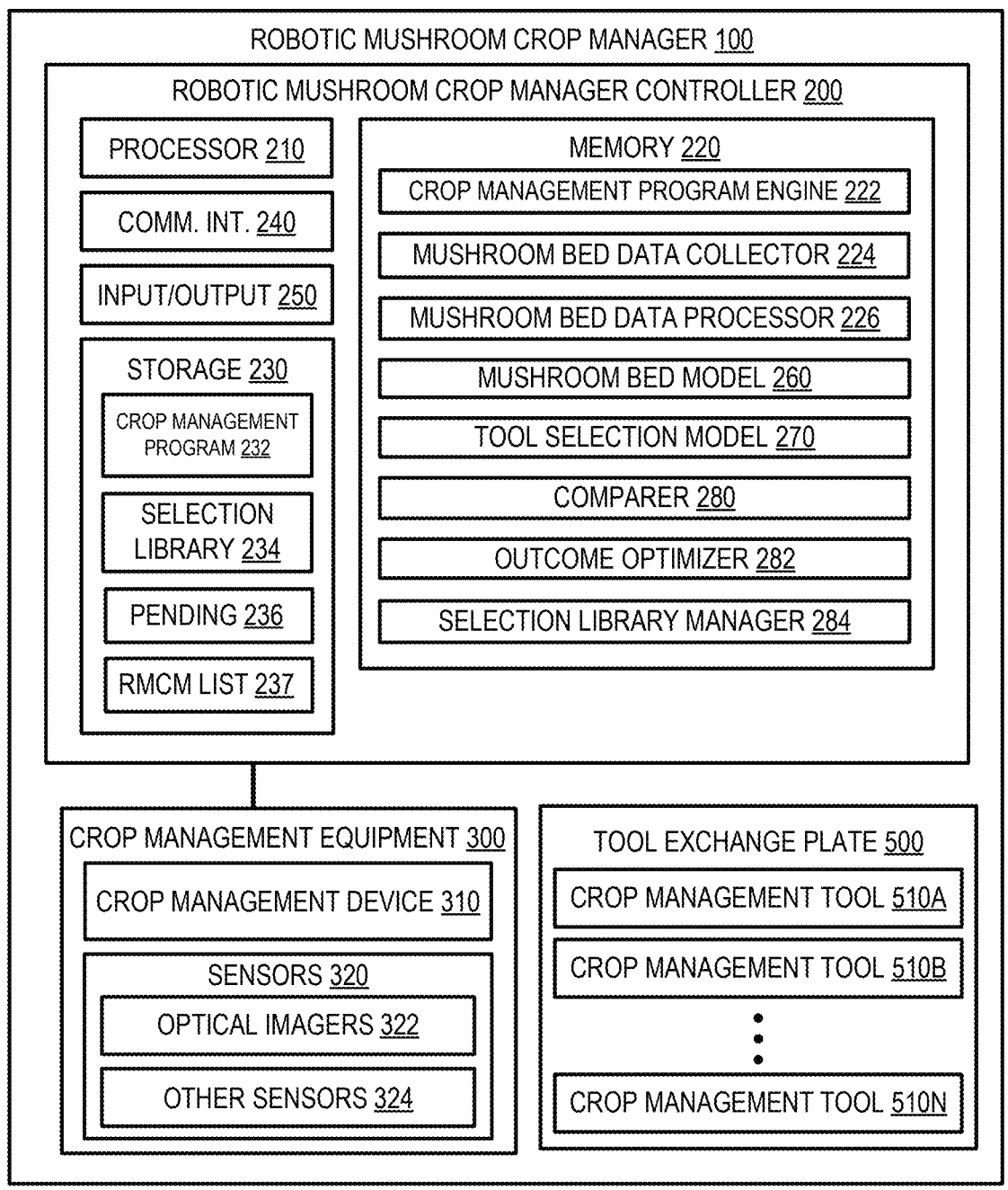
FIG. 2 is a block diagram of a robotic mushroom crop manager.

Each robotic mushroom crop manager 100A, 100B . . . 100N may be an individual instance of the robotic mushroom crop manager 100 shown in FIG. 2. The robotic mushroom crop manager 100 may have a robotic mushroom crop manager controller 200, and crop management equipment 300. The robotic mushroom crop manager 100 may have or be operative to cooperate with a tool exchange plate 500 including a plurality of crop management tools 510A, 510B . . . 510N. The robotic mushroom crop manager 100 and the tool exchange plate 500 may be, include, or be a similar to or a modification of, embodiments of a mushroom harvesting robot and tool change station, respectively, as described and shown in WIPO International Publication Number WO 2023/010198 A1, the entirety of which is incorporated herein by reference.

The robotic mushroom crop manager controller 200 may be operative to control the crop management equipment 300 to perform a crop management program. The robotic mushroom crop manager controller 200 may have a processor 210, a memory 220, a storage 230, a communications interface 240, and input/output equipment 250. The memory 220 may store instructions operable by the processor 210 using the storage 230, the communications interface 240, and the input/output equipment 250 to performs the functions described herein. In particular, the memory 220 may store a crop management program engine 222 and a mushroom bed data collector 224. The memory 220 may also store a mushroom bed data processor 226. The robotic mushroom crop manager controller 200 may interface with the crop management equipment 300 in order to communicate with and to control the crop management equipment 300 as described herein.

The crop management equipment 300 may have at least one crop management device 310 and sensors 320. The sensors 320 may include optical imagers 322 (intended to encompass either a single optimal imager or a plurality of optical imagers as required by context), and may also include other sensors 324 (likewise). The robotic mushroom crop manager controller 200 is operable to use the crop management program engine 222 to control the crop management equipment 300 to use the crop management device 310 to perform a crop management program 232, which may be stored in the storage 230. At the same time, the robotic mushroom crop manager controller 200 is operable to use the mushroom bed data collector 224 to use the sensors 320 to collect mushroom bed data, as described herein.

Figure 3:
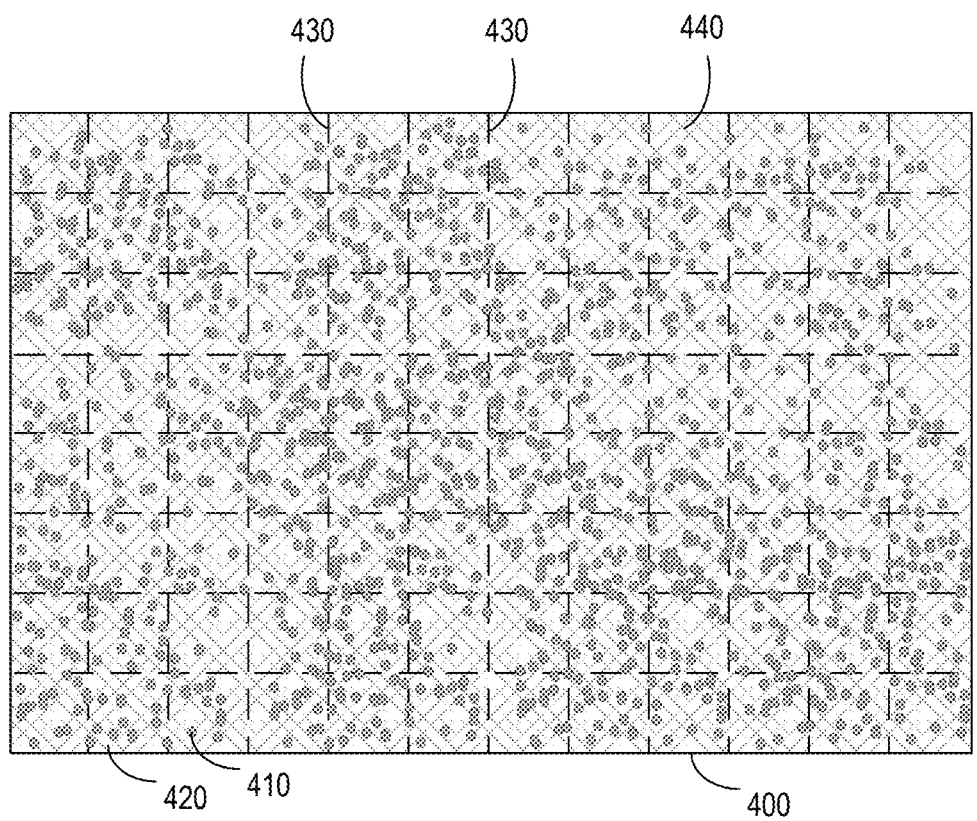
FIG. 3 is a figurative drawing of a mushroom bed.

With reference to FIG. 3, the processor 210 is operative to use the crop management program engine 222 to control the crop management equipment 300 to perform the crop management program 232 relative to a mushroom bed 400 containing a number of mushrooms 410 (only one of which is identified by a reference character and lead line to avoid clutter) in a growing medium 420. The growing medium 420 may be of any suitable form or composition. For example, the growing medium 420 may include a casing soil, which may include a peat and lime mixture, layered atop a substrate, which may include a composted mixture of wheat straw, animal manure, and gypsum, which is pasteurized, inoculated, and colonized with spawn of a selected mushroom strain. The crop management program 232 may include a sequence of actions to be performed by the crop management equipment 300, including actions to be performed by the crop management device 310. Without limitation, such actions may include: moving the crop management equipment 300 to or above any location on the mushroom bed 400; using the crop management device 310 to harvest a specific mushroom 410 at a particular location in the mushroom bed 400; and using the crop management device 310 to move or otherwise disturb the growing medium 420 at a particular location in the mushroom bed 400.

In particular, the processor 210 may generate and operate a mushroom bed model 260 of the mushroom bed 400, and to perform the crop management program 232 based at least partly on the mushroom bed model 260. The crop management program engine 222 may further be operable, for a given one of the sequence of actions in the crop management program 232, and for a given state of the mushroom bed 400 according to the mushroom bed model 260, to select one of the crop management tools 510A, 510B . . . 510N for performance of that action by the crop management device 310.

Figure 4:
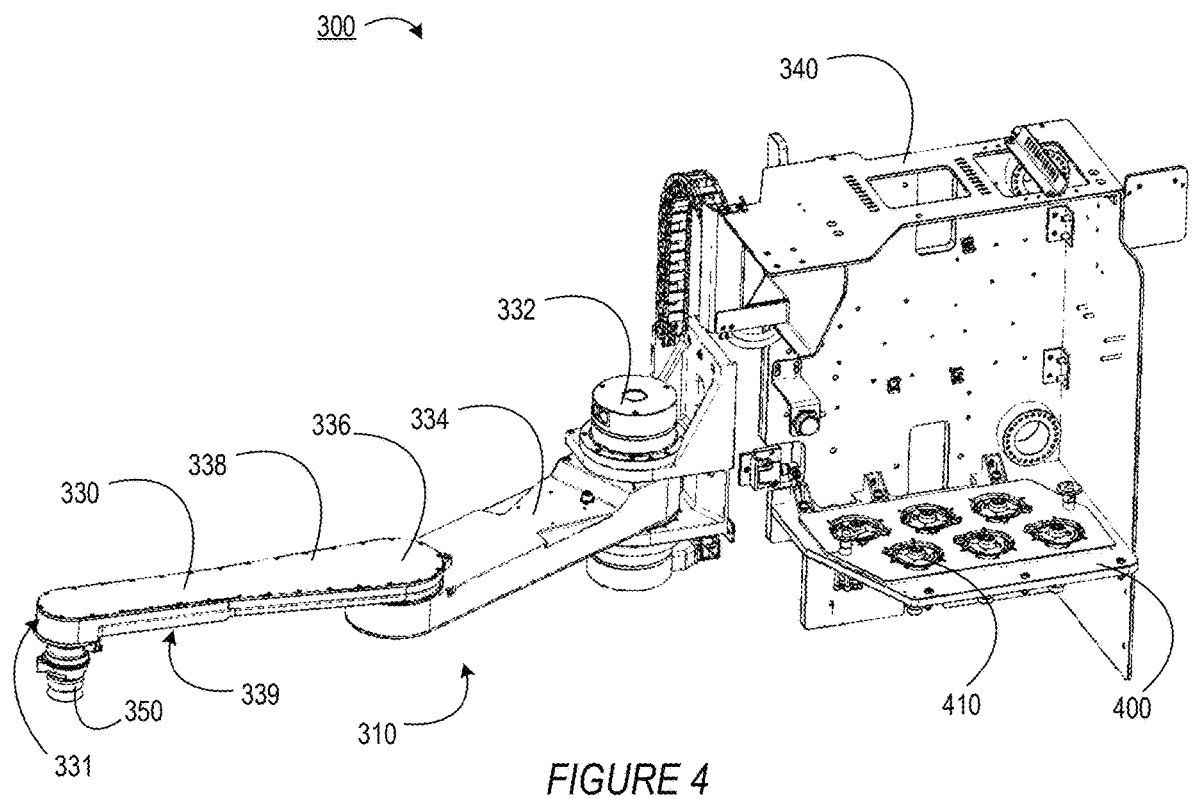
FIGS. 4 & 5 show perspective views of one non-limiting embodiment of crop management equipment.
Figure 5:
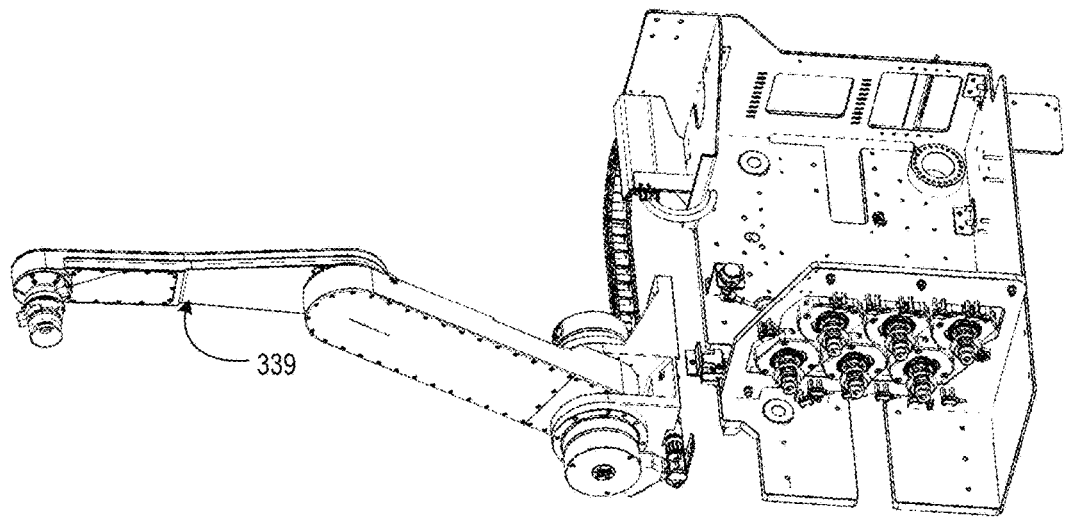

One non-limiting embodiment of crop management equipment 300 is shown in FIGS. 4 & 5. The crop management device 310 comprises a robotic arm 330 operatively mounted to a carriage assembly 340. The robotic arm 330 comprises a shoulder 332, an upper arm 334 pivotally mounted to the shoulder 332, an elbow 336, and a forearm 338 pivotally mounted to the upper arm 334 at the elbow 336. An end effector 350 is releasably mounted to the free end 331 of forearm 338.

The sensors 320 may be mounted to or proximal the crop management device 310 of the crop management equipment 300 so as to be operable to sense the mushroom bed 400 at or about the current position of the crop management device 310. In particular, at least some of the optical imagers 322, which may be digital cameras, may be coupled to the crop management equipment 300 adjacent or proximal the crop management device 310 in such a way as to provide a field of view containing the crop management device 310 and an area of the mushroom bed 400 in which the crop management device 310 is operable to harvest mushrooms 410 in the field of view. For example, one of the optimal imagers 322 may be a harvesting imager, covered by a transparent harvesting imager shield 323, mounted at an underside 339 of the forearm 338, which may be proximal the end effector 350 relative to the elbow 336. In this way, a field of view of the harvesting imager, which may be a plan or overhead view, may coontain a portion of the mushroom bed 400 beneath the end effector 350 in use, and may also contain at least a portion of the end effector 350 itself. Another one of the optimal imagers 322 may be a trimming imager, covered by a transparent trimming imager shield 325, mounted to the robotic arm 330 or the carriage assembly 340 and positioned, oriented, and configured in such a way as to provide an elevation, side, or perspective view of the portion of the end effector 350 and portion of the mushroom bed 400 beneath the end effector 350 when in use, which field of view may correspond to the field of view of the harvesting imager, in that they are directed to a common object viewed from different angles. For example, the trimming imager may be mounted at an underside of the 339 of the forearm 338, but now proximal the elbow 336 relative to the end effector 350, and aimed toward the end effector 350. Alternatively, the trimming imager may be mounted at an underside of the upper arm 334, the shoulder 332, or to the carriage assembly 340, and positioned, oriented, and configured to provide the field of view described herein.

As noted above, the sensors 320 may include other sensors 324, which may or may not be limited by field of view in this way. The other sensors 324 may include one or more of an air temperature sensor, an air humidity sensor, a motion sensor, an orientation sensor, a light sensor, a soil pH sensor, a soil moisture sensor, a soil temperature sensor, a soil nutrient sensor, a soil pest/insect sensor, and a soil pollution sensor. Any one or more of the other sensors 324 may be positioned or mounted at the robotic arm 330, which may also be at an underside of the robotic arm 330

The mushroom bed data collector 224 may be operable by the processor 210 to collect using the sensors 320 a stream of data about the state and conditions of the mushroom bed 400 including the growing mushrooms 410 and optionally also the growing medium 420 (collectively, "mushroom bed data"). In particular, the mushroom bed data collector 224 may use the optical imagers 322 to collect a continuous stream of images of the mushroom bed 400 in the field of view of the optimal imagers 322. The optical imagers 322 may be operated to continuously collect images as the crop management device 310 is continuously moved from position to position above the mushroom bed 400 while performing the crop management program 232. The mushroom bed data collector 224 may be further operable to collect using the other sensors 324, when provided, a stream of data about the state and conditions of the mushroom bed 400 corresponding to the nature of such other sensors 324.

In particular, the mushroom bed data may include, quantify, or enable determination of one or more properties or characteristics of the mushroom bed 400, the growing mushrooms 410, and optionally the growing medium 420. A non-limiting list of such properties or characteristics of the mushrooms 410 may include: size; shape; density; defects; marks; quality grade; anomalies; surface texture; underside spacing between cap and growing medium; stem length; and stem orientation. When included, a non-limiting list of the properties or characteristics of the growing medium 420 may include: pH, moisture, temperature, nutrient quantities, pest/insect quantities, and pollution quantities. The mushroom bed data may be position-aware, in that it is associated with (which may be in the form of metadata) a collection location on the mushroom bed 400 where the mushroom bed data was collected by the sensors 320. For example, the mushroom bed data may be indexed according to a virtual partitioning of the mushroom bed 400. For example, as shown in FIG. 3, the mushroom bed 400 may be divided by a set of gridlines 430 into a set of mushroom bed cells 440, sometimes called 'sliding windows', and the mushroom bed data may be collected and indexed in accordance with the mushroom bed cells 440. Such mushroom bed cells 440 may have any appropriate size, shape, or dimensions. In some embodiments, the mushroom bed cells 440 are squares having a side dimension of from about 0.5" to about 5", or at least about 1", or about 1", although other dimensions are possible and contemplated. Any suitable alternative arrangement may be used, including for example, a hexagonal tiling arrangement. The mushroom bed data may also be time-aware, in that it is associated with (which may be in the form of metadata) a collection time at which the mushroom bed data was collected by the sensors 320. For example, when the mushroom bed data is or includes images of the mushroom bed 400, the images may be indexed, labelled, or otherwise associated with a location on the mushroom bed 400 where the image was collected by the optimal imagers 322, and may also be indexed, labelled, or otherwise associated with a time at which the image was collected by the optimal imagers 322. The position and/or the time may be generated by the crop management equipment 300 itself and received by the robotic mushroom crop manager controller 200, or it may be generated by the robotic mushroom crop manager controller 200.

The sensors 320 may be operable to collect mushroom bed data in any desired time interval. For example, the sensors 320 may be operated to collect mushroom bed data every 1-1000 ms, although other time intervals are contemplated. The mushroom bed data collector 224 may receive raw mushroom bed data from sensors 320 using any communicative connection between the robotic mushroom crop manager controller 200 and the crop management equipment 300. The connection may be a wired connection, a wireless connection, and may use the communications interface 240 to receive the raw mushroom bed data. The raw mushroom bed data may then be stored in the storage 230. The processor 210 may operate the mushroom bed data processor 226 as part of a computer vision system to process the raw mushroom bed data into pre-processed mushroom bed data, which may also be stored in the storage 230. For example, the mushroom bed data processor 226 may be operable to process images collected by the optical imagers 322 to augment, enhance, colour-correct, convert, or compress such images, or to identify, parameterize, or otherwise any of the properties and characteristics described above.

The processor 210 may also be operable to train and operate a mushroom bed model 260 of the mushroom bed 400 based on the mushroom bed data. In particular, the transformed mushroom bed data generated by the mushroom bed data processor 226 may include mushroom bed data vectors configured for ingestion by the mushroom bed model 260. The mushroom bed data vectors may include or enable determination of any quantifiable properties or characteristics of the mushroom bed 400, mushrooms 410, and optionally the growing medium 420, as described herein. When the mushroom bed data is or includes a stream of images, including position-indexed and time-indexed images, as described herein, the mushroom bed data vectors may be or include the images in any suitable encoding, which may include or be labelled by, which may be by metadata, corresponding locations and times. Any suitable object-detection techniques or metrics may be used, which may include intersection-over-union similarity measures. For example, one non-limiting mushroom bed data vector includes any combination of at least some, or all, of the following attributes: time stamp; mushroom bed cell index (e.g. row and column indices); window size; light configuration (e.g. RGB values); distance/depth (which may be in combination with light configuration as RGB-D values); motion quantities (which may be speed, velocity, inertia values of camera, sensors, or related structure); environmental data (such as moisture, temperature, surface substrate quality; substrate grade); and metrics of mushrooms in window (such as size, density, number of high density clumps, proportion of high quality mushrooms). Other quantities and measures are possible and contemplated.

As discussed above, the mushroom bed data may enable a determination of properties or characteristics of the mushrooms 410 including without limitation: size; shape; density; defects; marks; quality grade; anomalies; surface texture underside spacing between cap and growing medium; stem length; and stem orientation. When the collected mushroom bed data is or includes a stream of images, as described herein, the mushroom bed model 260 may be trained to generate and predict such properties or characteristics, as described further below.

Specifically, the processor 210 may be operable to train the mushroom bed model 260 by using a comparer 280. In an initial training stage, the mushroom bed data processor 226 may be used to generate mushroom bed data vectors based on mushroom bed data received as described herein, where the corresponding known mushroom bed state vectors encoding the properties and characteristics of the mushroom bed 400, including the mushrooms 410, and optionally the growth medium 420 are determined by an additional procedure.

Figure 6:
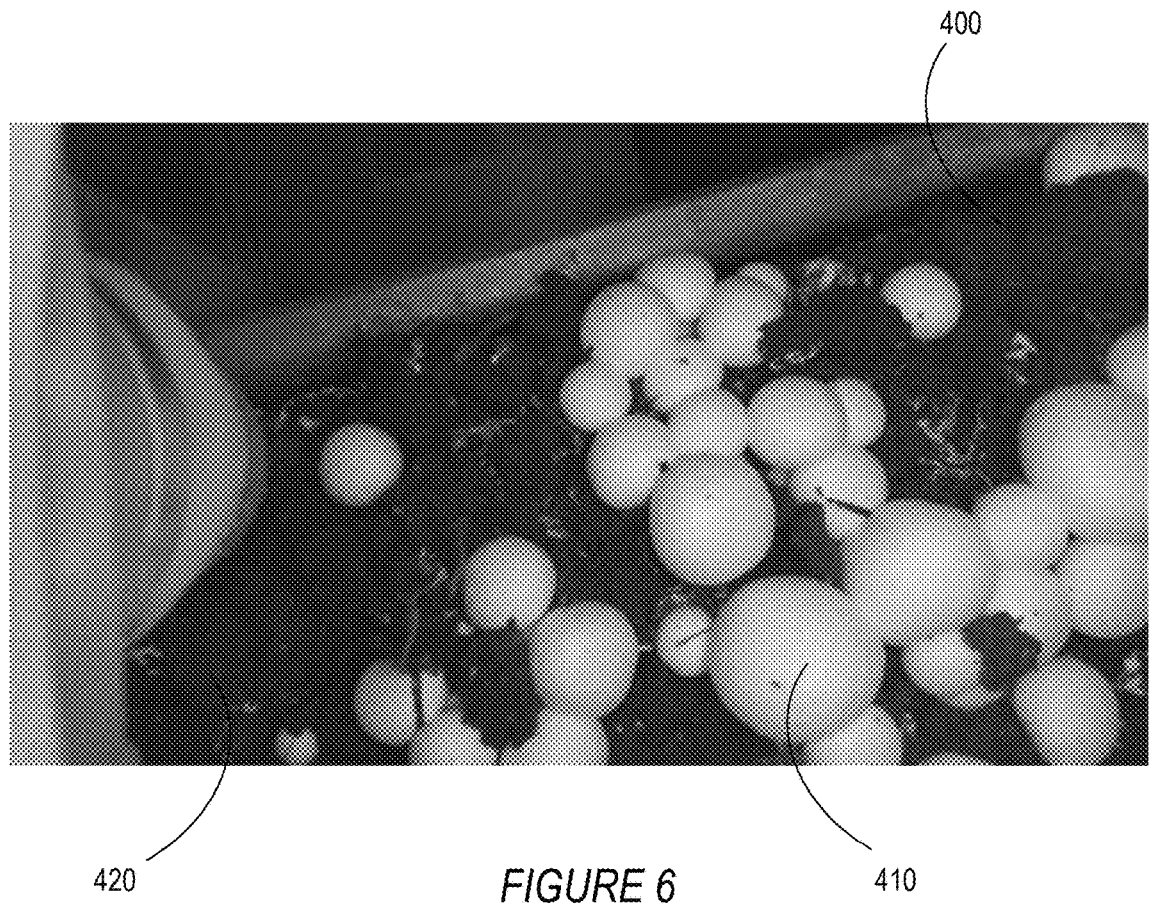
FIG. 6 is an image of an actual mushroom bed with growing mushrooms in real growth medium.
Figure 7:
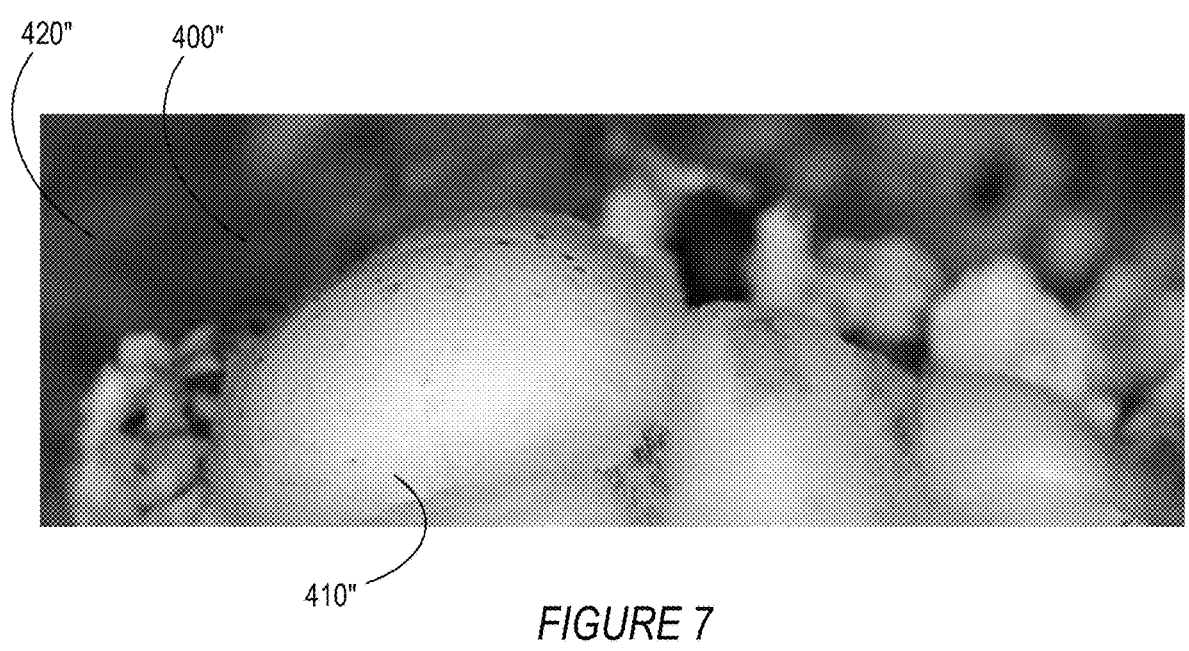
FIG. 7 is an image of a synthetic mushroom bed with synthetic mushrooms.

For example, with reference to FIG. 6, the mushroom bed 400 may be an actual mushroom bed 400 with live, growing mushrooms 410 in a real growth medium 420, and the known mushroom bed state vectors encoding the properties and characteristics of the mushroom bed 400 may be determined manually, which may be by manual inspection. Alternatively, and with reference to FIG. 7, the mushroom bed 400 may a synthetic mushroom bed 400", with synthetic mushrooms 410", and optionally synthetic growth medium 420", fabricated purposefully to possess preconfigured mushroom bed state vectors encoding a predetermined variety of the mushroom bed (including mushroom) properties and characteristics. In any case, the mushroom bed data vectors so received and generated may include or be labelled with the known mushroom bed state vectors. The mushroom bed model 260 may then process such labelled mushroom bed data vectors using the comparer 280 to determine differences between the known mushroom bed state vectors and the predicted mushroom bed state vectors generated by the mushroom bed model 260 based on the received mushroom bed data vectors, to learn to predict the corresponding known mushroom bed state vectors, and thus the known mushroom bed state.

The processor 210 may be operable to train the mushroom bed model 260 using any suitable techniques known in the art. A network architecture or topology may be established, and layers may be added which are associated with respective optimization functions, activation functions, and/or loss functions. One or more artificial neural networks may be used, and each may of any suitable type, including without limitation convolutional neural networks, recurrent neural networks, and deep learning neural networks. The mushroom bed model 260 may involve one artificial neural networks, or may involve multiple different artificial neural networks. The mushroom bed model 260 may include instructions using supervised or unsupervised machine learning, involving identifying and recognizing patterns in the mushroom bed data (in the form of the mushroom bed data vectors) to enable recognition of mushroom bed states of the mushroom bed. The mushroom bed data and the differences between the actual and predicted mushroom bed state described herein which may be used to train the artificial neural network may be encoded in any suitable manner, such as, without limitation, an N-dimensional tensor, a matrix, or an array. Training of the artificial neural network may involve parameters initialized to random values, which are changed with each iteration, using any appropriate algorithm to converge to predetermined values. Such algorithms may include, for example, gradient descent, stochastic gradient descent (SGD), minibatch SGD, nonlinear conjugate gradient, limited-memory Broyden-Fletcher-Goldfarb-Shanno (L-BFGS), or Levenberg-Marquardt (LMA) algorithms. Training of the artificial neural network may employ any appropriate statistical model, which may be a multinomial logistic regression model, a random forest model, a decision tree, a logistic regression model, or a gradient boosting model.

As indicated above, the robotic mushroom crop manager 100 may also have or be operative to cooperate with a tool exchange plate 500. In the embodiment shown in FIGS. 4 & 5, the tool exchange plate 500 forms a part of the crop management equipment 300, and is mounted to the carriage assembly 340. The tool exchange plate 500 supports a plurality of crop management tools 510 (only one of which is identified with a reference character and lead line in order to avoid clutter). The crop management tools 510 are sized, shaped, and configured for coupling with and use by the robotic arm 330 end effector 350 to perform corresponding actions described herein. For example, different crop management tools 510 may have different sizes or configurations suitable for the harvesting of different sizes and/or types of mushrooms. Different crop management tools 510 may include, without limitation: suction cups with any suitable diameters, depths, dimensions, or configurations to accommodate any corresponding size, shape, or type of mushroom; grabbers with any number of fingers, such as 3, 4, 5, or 6, which may have knuckles or elbows; pipe-like tools with sharp, razor-like end to encircle a mushroom, which may be a mushroom pin, pass beyond it, and twist or otherwise disturb the substrate around it, in a circular manner; pipe-like tools with a moving section to close under a mushroom, which may be a mushroom pin, to lift it for transplantation, which may be in a circular manner; pipe-like tools with an end flattened to press on a mushroom, which may be a mushroom pin, to be destroyed but left in place to rot; irrigation tools; fertilization tools; spoon-like tools for substrate movement, manipulation, or transplantation; and tools with one or more environmental sensors embedded for real-time probing. Other types and arrangements of tools are possible and contemplated.

In particular, for each of the actions performable by the crop management device 310 relative to the mushroom bed 400 in accordance with the crop management program 232, a crop management device 310 may employ a crop management tool 510 selected from a plurality of crop management tools 510A, 510B . . . 510N. In particular, for a given set of conditions of the mushroom bed 400, a particular crop management tool 510 may be optimally functional for the performance of the action required by the crop management program. For example, different crop management tools 510 may have different sizes, shapes, or configurations suitable for the harvesting of different sizes and/or types of mushrooms 410. Different crop management tools 510 may have different sizes or configurations suitable for the movement or disturbance of the growing medium 420 at a particular location in the mushroom bed 400. The foregoing are non-limiting examples. As such, optimal performance of the crop management program 232 may involve for at least some of the actions performed in accordance with the crop management program 232 a selection of a particular crop management tool 510 from the plurality of crop management tools 510A, 510B . . . 510N which is optimal for the performance of that action given the corresponding conditions of the mushroom bed 400.

For this purpose, the crop management program engine 222 may be operable by the processor 210 for selecting a crop management tool 510 from the plurality of crop management tools 510A, 510B . . . 510N based on mushroom bed data collected from the mushroom bed 400. In particular, the processor 210 may be operable to continuously or periodically train a tool selection model 270 based on the mushroom bed data of the mushroom bed 400 including at least the mushrooms 410, and optionally the growing medium 420, which may be based on mushroom bed state vectors generated by the mushroom bed model 260. The processor 210 may be operable to train the tool selection model 270 to select a specified crop management tool 510 selected from the plurality of crop management tools 510A, 510B . . . 510N to perform a specified action on the mushroom bed 400 in order to produce a corresponding change in state of the mushroom bed 400. The change in state of the mushroom bed 400 may include a change in state of mushrooms 410 and optionally growing medium 420 at a specified future time. Any appropriate future time may be specified, and may be from 1 second to 1 hour (3600 seconds). More distant future times are also contemplated. With respect to each such selection and corresponding action, the processor 210 may be operable to train the tool selection model 270 based on feedback regarding a desired change in state of the mushroom bed 400, as further described below.

In particular, the processor 210 may be operable to train the tool selection model 270 by using an outcome optimizer 282. As discussed above, the crop management program engine 222 may be operable to control the crop management equipment 300 according to a crop management program 232, and the crop management program 232 may include a sequence of actions to be performed by the crop management device 310. Without limitation, such actions may include: harvesting a specific mushroom 410 at a particular location in the mushroom bed 400; and moving or otherwise disturbing the growing medium 420 at a particular location in the mushroom bed 400. Each such action may be characterized by parameters defining a desired or optimal outcome. For example, where the action is harvesting a mushroom 410, the desired or optimal outcome may include one or more of: minimizing damage to the mushroom 410; minimizing time required to harvest the mushroom; minimizing damage to adjacent or surrounding mushrooms 410; or minimizing disturbance of adjacent or surrounding growing medium 420. With respect to such actions, each one of the plurality of crop management tools 510A, 510B . . . 510N may produce a different actual outcome based on different properties of the particular crop management tool 510, and different properties of the mushroom bed 400, such as different sizes and/or types of mushrooms 410, or different kinds or conditions of growing medium 420. Given such different properties of the mushroom bed 400, one of the plurality of crop management tools 510A, 510B . . . 510N when used to perform the required action may produce an actual outcome which is closer to a desired or optimal outcome than the other ones of the crop management tools 510A, 510B . . . 510N. Therefore, for any given current state of the mushroom bed 400 (such as, a given current state of a particular mushroom 410) and a given action to be performed on the mushroom bed 400 in accordance with the crop management program (such as, to harvest the mushroom 410), the processor 210 may be operable to train the tool selection model 270 to predict which one of the plurality of crop management tools 510A, 510B . . . 510N is likely to produce an actual outcome which is closer to the desired or optimal outcome of the action as compared to the other ones of the crop management tools 510A, 510B . . . 510N.

In particular, and as discussed above, during performance of the crop management program 232, the mushroom bed data collector 224 may be operable to use the sensors 320 of the crop management equipment 300 to periodically or continuously collect mushroom bed data from the mushroom bed 400. In particular, the optical imagers 322 may be operable to collect a stream of images of the mushroom bed 400 in the respective fields of view of the optimal imagers 322 as the crop management device 310 is operated to perform actions on the mushroom bed 400. More particularly, the mushroom bed data collector 224 may be operable to use the sensors 320 of the crop management equipment 300 to collect mushroom bed data from the mushroom bed 400 at a time before the performance of a given action on the mushroom bed 400, and then also at a post-action time after the performance of the action on the mushroom bed 400. In this way, when the crop management program engine 222 controls the crop management equipment 300, and in particular the crop management device 310 to select a crop management tool 510 from a plurality of crop management tools 510A, 510B . . . 510N, and to use the selected crop management tool 510 to perform a corresponding action on the mushroom bed 400, the mushroom bed data collector 224 may be operable to use the sensors 320 of the crop management equipment 300 to collect mushroom bed data from the mushroom bed 400 at the pre-action time before the performance of the action and then also at the post-action time after the performance of the action on the mushroom bed 400. The processor 210, using the mushroom bed data collector 224, may then be operable to determine an actual outcome of the performance of the action on the mushroom bed 400 using the selected crop management tool 510 based on differences between the pre-action mushroom bed state, which may in the form of mushroom bed state vectors generated by the mushroom bed model 260, at the pre-action time and the post-action mushroom bed state, which again may in the form of mushroom bed state vectors generated by the mushroom bed model 260, at the post-action time, and to determine an outcome difference, which may be by using the comparer 280, between the actual outcome and a desired outcome in accordance with the crop management program 232.

In particular, the processor 210 may use the outcome optimizer 282 to compare the actual outcome and the desired outcome of the action performed on the mushroom bed 400 using the crop management tool 510 selected from the plurality of crop management tools 510A, 510B . . . 510N. The comparer 280 may receive from the mushroom bed model 260 a post-action mushroom bed state vector of the mushroom bed based on mushroom bed data collected at the post-action time after performance of the action by the selected crop management tool 510, which encodes characteristics and properties of the mushroom bed 400 at the post-action time, and further receive from the mushroom bed model 260 a pre-action mushroom bed state vector of the mushroom bed based on mushroom bed data collected at the pre-action time before performance of the action by the selected crop management tool 510, which encodes characteristics and properties of the mushroom bed 400 at the pre-action time, and the pre-action mushroom bed state vector and the post-action state vector to determine the actual outcome of the action. The processor 210 may then use the outcome optimizer 282 to compare the actual outcome of the action so generated with a desired outcome based on desired properties and characteristics of the mushroom bed 400 in accordance with the crop management program. As discussed above, a non-limiting list of properties or characteristics of mushrooms 410 includes: size; shape; density; defects; marks; quality grade; anomalies; surface texture underside spacing between cap and growing medium; stem length; and stem orientation. And, when included, a non-limiting list of the properties or characteristics of the growing medium 420 includes: soil pH, soil moisture, presence and/or concentration of gases (such as $CO_2$), soil temperature, soil nutrient, soil pest/insect, and soil pollution. Thus, the crop management program may include a desired outcome relative to any one or more of such properties and characteristics of the mushroom bed 400 to be caused by the performance of the action by the crop management device 310, and the processor 210 may be operable to use the outcome optimizer 282 to compare and determine differences between the actual outcome with respect to such one or more properties and characteristics with the desired outcome of the action.

For example, where the action is harvesting a mushroom 410, the desired or optimal outcome may include one or more of: minimizing damage to the mushroom 410; minimizing time required to harvest the mushroom; minimizing damage to adjacent or surrounding mushrooms 410; or minimizing disturbance of adjacent or surrounding growing medium 420. The processor 210, using the comparer 280 and the outcome optimizer 282, may then use these differences to train the tool selection model 270 to learn to predict the actual outcomes of the performance of corresponding actions on the mushroom bed 400 using each of the plurality of crop management tools 510A, 510B . . . 510N, and in this way to predict for a given action in the crop management program which one of the plurality of crop management tools 510A, 510B . . . 510N is likely to produce an actual outcome which is closest to the desired outcome-that is, which is an optimal outcome.

For any given action performed using a selected crop management tool 510, a time interval between the performance of the action and collection of mushroom bed data to determine an actual mushroom bed state as described may be any desired time interval. For example, the time interval may be about 0.1 to about 600 seconds, or about 1 to about 60 seconds, or about 5 to about 10 seconds, although other time intervals are contemplated. In order to use the comparer 280 and outcome optimizer 282 to compare and determine differences between the actual outcome with respect to one or more properties and characteristics of the mushroom bed 400 with the desired outcome of the action, as described above, the processor 210 may, for a given action, be operable to store tool selection data in a pending data structure 236, which may be stored in the storage 230, which associates the mushroom bed state at the time of the action, the time of the action, and the selected crop management tool 510 used to perform the action. Then, at or about an end of the time interval, the processor 210 may be operable to fetch the tool selection data from the pending data structure 236 for use by the comparer 280 and the outcome optimizer 282 to compare and determine differences between the actual outcome with respect to one or more properties and characteristics of the mushroom bed 400 with the desired outcome of the action, as described.

For example, where the action performed by one of the plurality of crop management tools 510A, 510B . . . 510N is to harvest a specific mushroom 410, the desired or optimal outcome may include minimizing damage to the mushroom 410. The crop management program engine 222 may be operable to select one of the plurality of crop management tools 510A, 510B . . . 510N to perform the harvesting action. The mushroom bed data collector 224 may be operable to control the crop management equipment 300 sensors 320, and particularly the optical imagers 322—including particularly the g imager and the trimming imager described above-to periodically or continuously collect images of the mushroom 410 before, during, and after harvesting of the mushroom 410 by the selected crop management tool 510. For example, the mushroom bed data collector 224 may collect images of the mushroom 410 as it is lifted by the selected crop management tool 510, as the mushroom 410 stem is trimmed, as the trimmed mushroom 410 is carried to a collection box, as the mushroom 410 is dropped in the collection box, and when the mushroom 410 is resting in the collection box. In particular, the harvesting imager may provide a plan or overhead view of the mushroom 410 immediately before it is grasped and lifted by the selected crop management tool 510 and after it is dropped in the collection box, while the trimming imager, which provides an elevation, side, or perspective view of the portion of the end effector 350 as described above, may provide a view of the mushroom 410 once it has been grasped and lifted by the selected crop management tool 510 and while it is being moved to the collection box. In this way, the collection of images with respect to the interaction between the selected crop management tool 510 and the mushroom 410 may be comprehensive.

Thus, the processor 210 of the robotic mushroom crop manager controller 200 may be operable, based on the mushroom bed data so collected, to use the mushroom bed model 260 to model and characterize the mushroom 410 at selected points, periodically, or throughout the harvesting action as described, and then to use the comparer 280 and outcome optimizer 282 to compare and determine differences between the actual outcome of the mushroom 410 with respect to one or more properties and characteristics with the desired outcome of the harvesting action, as described. This may include, for example, an amount or degree of damage caused to the mushroom 410, which may be either to its cap or stem. The determined differences between the actual outcome with the desired outcome may then be used to further train the tool section model 270.

The processor 210 may be operable to train the tool selection model 270 using any suitable techniques known in the art. A network architecture or topology may be established, and layers may be added which are associated with respective optimization functions, activation functions, and/or loss functions. One or more artificial neural networks may be used, and each may of any suitable type, including without limitation convolutional neural networks, recurrent neural networks, and deep learning neural networks. The tool selection model 270 may involve one or more of the same artificial neural networks, or may involve different artificial neural networks. The tool selection model 270 may include instructions using supervised or unsupervised machine learning, involving identifying and recognizing patterns in the mushroom bed data (in the form of the mushroom bed data vectors) to enable recognition of mushroom bed states of the mushroom bed, and to enable prediction of a selected crop management tool to produce an optimal actual outcome. The mushroom bed data, used to generate mushroom bed state vectors as described, and the differences between the actual and desired outcomes described herein which may be used to train the artificial neural network may be encoded in any suitable manner, such as, without limitation, an N-dimensional tensor, a matrix, or an array. Training may be performed in any suitable manner, and may include iterative training using labeled training data as described herein. Training of the artificial neural network may involve parameters initialized to random values, which are changed with each iteration, using any appropriate algorithm to converge to predetermined values. Such algorithms may include, for example, gradient descent, stochastic gradient descent (SGD), minibatch SGD, nonlinear conjugate gradient, limited-memory Broyden-Fletcher-Goldfarb-Shanno (L-BFGS), or Levenberg-Marquardt (LMA) algorithms. Training of the artificial neural network may employ any appropriate statistical model, which may be a multinomial logistic regression model, a random forest model, a decision tree, a logistic regression model, or a gradient boosting model.

In order to optimize the speed and efficiency of selection of an optimal crop management tool 510 from the plurality of crop management tools 510A, 510B . . . 510N given a required action of the crop management program, the processor 210 may be further operable to use a selection library manager 284. As described above, the processor 210 may be operable to use the comparer 280 and outcome optimizer 282 to compare and determine differences between the actual outcome of a given action performed using a selected crop management tool 510 with respect to one or more properties and characteristics with the desired outcome of the action. At a certain point, the likelihood that a given crop management tool 510 may produce an optimal outcome as compared to the other ones of the plurality of crop management tools 510A, 510B . . . 510N is sufficiently great that, thereafter, for a given action, when the relevant properties and characteristics of the mushroom bed 400 fall within respective preconfigured ranges the selection of that crop management tool 510 may also be preconfigured, such that use of the tool selection model 270 to determine a selected crop management tool 510 may be avoided.

To this end, the processor 210 may operate the selection library manager 284 to store in a selection library datastore 234, stored in the storage 230, predetermined tool selection data, which may be a record in a look-up table, associating a predetermined optimal one of the plurality of crop management tools 510A, 510B . . . 510N with a given action included in the crop management program and a preconfigured combination of preconfigured ranges of the the properties and characteristics of the mushroom bed 400. The selection library manager 284 may be configured to do so when a likelihood that a given crop management tool 510 may produce an optimal outcome as compared to the other ones of the plurality of crop management tools 510A, 510B . . . 510N exceeds a predefined threshold. In some embodiments, the selection library manager 284 is configured to do so on any given successful action, that is when the determined differences between the actual outcome of a given action performed using a selected crop management tool 510 with respect to one or more properties and characteristics with the desired outcome of the action, as described above, matches within a predefined threshold. In other words, the selection library manager 284 may be configured to store in the selection library datastore 234 predetermined tool selection data on the very first instance of a successful action according to the noted predefined threshold.

Then, in general, as the processor 210 uses the crop management program engine 222 to perform the crop management program 232, for each action performable in accordance therewith, the processor 210 may use the selection library manager 284 to determine when an optimal tool selection threshold is met for a given one of the plurality of crop management tools 510A, 510B . . . 510N in association with a given action in the crop management program and given preconfigured ranges of the properties and characteristics of the mushroom bed 400, which may be preconfigured ranges of dimensions of a current mushroom bed state vector. For example, the given action may be harvesting a selected mushroom 410, and the characteristics of the mushroom bed 400 may include one or more of: a size, shape, and orientation of the mushroom, including an orientation of the stem and spacing between an underside of the cap and top surface of the growing medium; and number, sizes, spacing, and orientations of surrounding mushrooms. The processor 210, before using the tool selection model 270 as described above to select one of the plurality of crop management tools 510A, 510B . . . 510N to perform the given action based on a current mushroom bed state, may first instead use the selection library manager 284 to access the selection library datastore 234 to determine whether the selection library datastore 234 contains predetermined tool selection data, which may be a record, encoding the above-described association—that is, for the given action, defines preconfigured ranges of the properties and characteristics of the mushroom bed 400 into which the current mushroom bed state falls. In this way, the processor 210 may avoid using the tool selection model 270 to select a crop management tool 510, and instead select the crop management tool 510 identified in the predetermined tool selection data. The selection library manager 284 may operate in this way using less time and fewer computational resources than the tool selection model 270, and in this way the overall performance of the crop management program by the crop management program engine 222 may likewise use less time and fewer computational resources.

The processor 210 may further operate the selection library manager 284 to update the selection library datastore 234, stored in the storage 230, as the crop management program 232 is performed. In particular, if and when a given action in the crop management program and given ranges of the properties and characteristics of the mushroom bed 400 is performed using one of the plurality of crop management tools 510A, 510B . . . 510N based the selection library datastore 234 containing a record with matching predetermined tool selection data, as described above, but the action does not in fact produce an actual outcome within the preconfigured similarity with the desired outcome, as described above, then the processor 210 may be operable to use the selection library manager 284 to access the selection library datastore 234 to remove that record.

Thus, a robotic mushroom crop manager 100 as shown and described above is thus operable to optimize tool selection for use by harvesting equipment to perform actions of a crop management program on a mushroom bed. For example, the robotic mushroom crop manager 100 is operable to optimize selection of a crop management tool from a plurality of crop management tools available on a tool exchange plate for harvesting mushrooms from the mushroom bed, so as to minimize damage caused to the mushrooms and also to optimize time spent harvesting the mushroom. The robotic mushroom crop manager 100 is operable to train a tool selection model 270 based on collected mushroom bed data. A selection library manager 284 is operable, for a given crop management program action and mushroom bed state, to determine an optimal crop management tool by lookup in a selection library datastore 234. In this way, the robotic mushroom crop manager 100 may be progressively configured for optimal crop management tool selection over time.

In order to accelerate and optimize the process of crop management tool selection by a particular robotic mushroom crop manager 100, however, a plurality of like or similar robotic mushroom crop manager 100 may cooperate in such a way as to share, in effect, the lessons learned with respect to crop management tool selections made by all of them, so that any one of the robotic mushroom crop manager 100 may, in a given situation, benefit from the experiences of all of the others.

For this purpose, and as shown in FIG. 1 and as described above, the automated mushroom crop management system 000 may have a plurality of robotic mushroom crop managers 100A, 100B . . . 100N communicatively coupled via a network 900. Each one of the plurality of robotic mushroom crop managers 100A, 100B . . . 100N may be configured as described above, and in particular may be configured to develop its respective selection library 234 based on successful actions performed by its crop management equipment 300 using a selected one of the plurality of crop management tools 510A, 510B . . . 510N as described above. The automated mushroom crop management system 000 may be configured such that one or more, which may be each, of the plurality of robotic mushroom crop managers 100A, 100B . . . 100N is operable to benefit from the experience gained from all of them with respect to the selection of an optimal crop management tool 510 for the performance of a given action.

Specifically, one or more, which may be each, or which may be very one, of the robotic mushroom crop managers 100A, 100B . . . 100N may store in its respective storage 230 a robotic mushroom crop manager (RMCM) list datastore 237 which stores records corresponding respectively to one or more of the other robotic mushroom crop managers 100A, 100B . . . 100N. Each such record may store, among other things, an identifier and a communication address, which may be a network address, of the corresponding robotic mushroom crop manager 100. Records corresponding to all or a subset of the other robotic mushroom crop managers 100A, 100B . . . 100N may be stored in this way. In particular, for a given one of the robotic mushroom crop managers 100A, 100B . . . 100N, records corresponding to only a subset of the other robotic mushroom crop managers 100A, 100B . . . 100N may be stored, based on a similarity of respective parameters of the subset of other robotic mushroom crop managers 100A, 100B . . . 100N and the given one of the robotic mushroom crop managers 100A, 100B . . . 100N. Such parameters may include, without limitation: location of the other robotic mushroom crop manager 100; and type or types of mushrooms 410 of the mushroom bed 400 associated with that other robotic mushroom crop manager 100.

Thus, and as described above, when the processor 210 uses the crop management program engine 222 to perform the crop management program 232, and uses the selection library manager 284 to access the selection library datastore 234 to determine whether the selection library datastore 234 contains predetermined tool selection data for the given action, and when it determines that the selection library datastore 234 does not contain predetermined tool selection data for the given action, the processor 210 may then be operable, which may be by use of the selection library manager 284, the access the RMCM list 237 to determine whether it contains a record of other robotic mushroom crop managers 100A, 100B . . . 100N having respective parameters similar within a predefined threshold to parameters of the robotic mushroom crop manager 100. For example, the predefined threshold may be that a respective location of the other robotic mushroom crop manager 100 is within a predefined distance of a location of the robotic mushroom crop manager 100, within a predefined distance of a location of certain crop management equipment 300, and/or a type of the mushrooms 410 of the mushroom bed 400 associated with that other robotic mushroom crop manager 100 is the same or similar within a predefined threshold to those of the robotic mushroom crop manager 100. In such case, the processor 210 may be operable, which may be using the selection library manager 284, to generate a tool selection request message, which may encode in association the given action in the crop management program 232 and a current mushroom bed state vector, and to use the communications interface 240 to communicate, which may be via the network 900, to those other robotic mushroom crop managers 100 whose parameters are the same or similar within the predefined threshold. The processor 210 may be configured either to wait up to a preconfigured waiting time for a reply before continuing to perform the crop management program 232, or it may be configured to skip the action involved, and may further be configured to reschedule the action to a later point in the crop management program, which may be done either immediately or after the preconfigured waiting time. For each of the other robotic mushroom crop managers 100 to which the tool selection request message was sent, and respectively throughout, the processor 210 thereof may be operable to use the communication interface 240 to receive the tool selection request message, and may further be operable, which may be using the selection library manager 284, to access the selection library datastore 234 to determine whether it stores predetermined tool selection data which matches the given action and the mushroom bed state vector encoded in the tool selection request message, which may be in the same manner as is done by the sending robotic mushroom crop manager 100 with respect to its own selection library datastore 234 as described above. In the case that the selection library datastore 234 does indeed store such predetermined tool selection data, then the processor 210 of the corresponding other robotic mushroom crop manager 100 may be operable, which may be using the corresponding selection library manager 284, to generate a tool selection reply message encoding the optimal tool selection encoded in that predetermined tool selection data, and may further be operable to use the corresponding communications interface 240 to transmit the tool selection reply message to the original robotic mushroom crop manager 100 which had sent the tool selection request message. The processor 210 of that original robotic mushroom crop manager 100 may then be operable using the corresponding communications interface 240 to receive the tool selection reply message. Then, the processor 210 may be operable using the selection library manager 284 to store in the selection library datastore 234 predetermined tool selection data associating that optimal tool selection with the mushroom bed state vector, in the same manner as described above generally. As such, when in performance of the crop management program 232 the processor 210 again encounters that given action, it is operable using the selection library manager 284 to access the selection library datastore 234, which now stores the predetermined tool selection data associating that optimal tool selection with the mushroom bed state vector, and thus is operable to use the crop management equipment 300 to perform the given action using that optimal crop management tool 510 as described.

Figure 8:
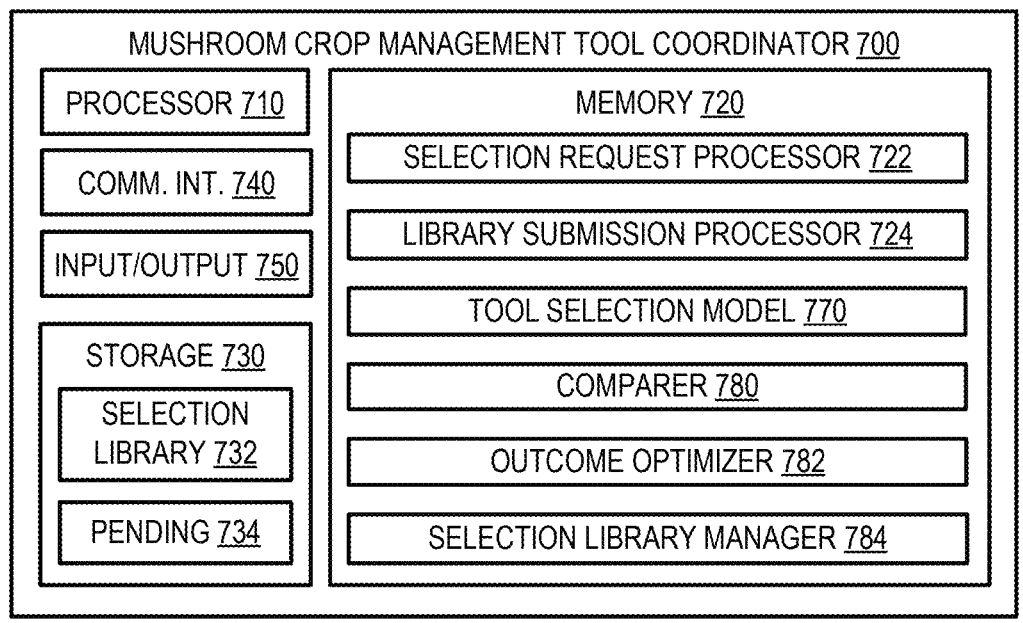
FIG. 8 is a block diagram of a mushroom crop management tool coordinator.

Additionally, or alternatively, the automated mushroom crop management system 000 may have a plurality of robotic mushroom crop managers 100A, 100B . . . 100N communicatively coupled with a mushroom crop management tool coordinator 700 via a network 900. An embodiment of the mushroom crop management tool coordinator 700 is shown in FIG. 8. The mushroom crop management tool coordinator 700 may have a processor 710, a memory 720, a storage 730, a communications interface 740, and input/output equipment 750. The memory 720 may store instructions operable by the processor 710 using the storage 730, the communications interface 740, and the input/output equipment 750 to perform the functions described herein. In particular, the memory 720 may store a selection request processor 722, and a library submission processor 724.

As described above, each robotic mushroom crop manager controller 200 may be operable to use its selection library manager 284 to determine when an optimal tool selection threshold is met for a given one of the plurality of crop management tools 510A, 510B . . . 510N in association with a given action in the crop management program and a given preconfigured ranges of the properties and characteristics of the mushroom bed 400. As described above, the selection library manager 284 may store in a selection library datastore 234 predetermined tool selection data associating the predetermined optimal one of the plurality of crop management tools 510A, 510B . . . 510N with the given action included in the crop management program and the preconfigured combination of preconfigured ranges of the the properties and characteristics of the mushroom bed 400. In such case, processor 210 may further be operable to use the communication interface 240 to transmit to the mushroom crop management tool coordinator 700 a library submission request encoding the predetermined tool selection data. The processor 710 of the mushroom crop management tool coordinator 700 may be operable to use the communications interface 740 to receive the library submission request, and to use the library submission processor 724 to process the library submission request. In particular, the library submission processor 724 may be operable to determine, as described below, whether to add the predetermined tool selection data encoded in the library submission request to the selection library 732 of the mushroom crop management tool coordinator 700, for use as further described below.

Specifically, the mushroom crop management tool coordinator 700 may be operable to receive library submission requests from a plurality of robotic mushroom crop manager controllers 200, as described. Until a threshold number of library submission requests is met, the processor 710 may be operable to store the received library submission requests in a pending datastore 734 in the storage 730. The memory 720 may further store a selection library manager 784, and once the threshold number of library submission requests is met, the processor 710 may be operable to use selection library manager 784 to process the stored library submission requests.

In particular, each stored library submission request may encode corresponding predetermined tool selection data as described above, associating a predetermined optimal one of the plurality of crop management tools 510A, 510B . . . 510N with a given action and a preconfigured combination of preconfigured ranges of the properties and characteristics of the mushroom bed 400. The corresponding predetermined tool selection data of the stored library submission requests may agree or disagree in certain respects. For example, the predetermined tool selection data of a first one of the library submission requests, for a given action and a first preconfigured combination of preconfigured ranges of the mushroom bed, may indicate selection of a particular one of the plurality of crop management tools 510A, 510B . . . 510N, while the predetermined tool selection data of a second one of the library submission requests, for the same action and a second preconfigured combination of preconfigured ranges of the mushroom bed which overlaps the first preconfigured combination, may indicate selection of a different one of the plurality of crop management tools 510A, 510B . . . 510N. In other words, the two library submission requests may disagree as to the optimal tool selection where the mushroom bed conditions are otherwise similar within a predefined threshold. Conversely, the predetermined tool selection data of a first one of the library submission requests, for a given action and a first preconfigured combination of preconfigured ranges of the mushroom bed, may indicate selection of a particular one of the plurality of crop management tools 510A, 510B . . . 510N, while the predetermined tool selection data of a second one of the library submission requests, for the same action and a second preconfigured combination of preconfigured ranges of the mushroom bed which overlaps the first preconfigured combination, may indicate selection of the same one of the plurality of crop management tools 510A, 510B . . . 510N. In other words, the two library submission requests may agree as to the optimal tool selection where the mushroom bed conditions are otherwise similar. In general, the stored library submission requests may agree or disagree in this way, within a range of degrees.

Thus, in order to generate predetermined tool selection data from the stored library submission requests, the mushroom crop management tool coordinator 700 may further store a selection library datastore 732 in the storage 730. The processor 710 may be operable to use the selection library manager 784 to perform any algorithm on the plurality of library submission requests to generate predetermined tool selection data, based at least in part on the range of degrees of agreement and disagreement of the plurality of library submission requests. For example, the selection library manager 784 may be operable to perform a random sample consensus method on the received library submission data structures. Alternatively, or additionally for an initial preconfigured period, the selection library manager 784 may be operable to generate and store in the selection library datastore 732 predetermined tool selection data as described based on each and every received library submission request. Any suitable arrangement is possible and contemplated.

In addition, for one or more of the robotic mushroom crop manager 100A, 100B . . . 100N, if and when a given action in the crop management program does not in fact produce an actual outcome within the preconfigured similarity with the desired outcome, as described above, then the processor 210 may be operable to use the communication interface 240 to transmit to the mushroom crop management tool coordinator 700 a library removal request encoding the mushroom bed state vector and tool selection involved in the action. The processor 710 of the mushroom crop management tool coordinator 700 may be operable to use the communications interface 740 to receive the library removal request, and to use the library submission processor 724 to process the library removal request. In particular, the library submission processor 724 may be operable to determine, as described below, whether to remove from the selection library 732 of the mushroom crop management tool coordinator 700 a record with predetermined tool selection data similar within a preconfigured range to the mushroom bed state vector and tool selection encoded in the library removal request.

The mushroom crop management tool coordinator 700 may be operable to assist any one or more robotic mushroom crop manager 100 to select one of the plurality of crop management tools 510A, 510B . . . 510N for the performance of an action in the crop management program being performed by that robotic mushroom crop manager 100. As described above, the processor 210 of each robotic mushroom crop manager 100 may be operable to use the selection library manager 284 to select one of the plurality of crop management tools 510A, 510B . . . 510N when the selection library 234 stores predetermined tool selection data, which may be a record in a look-up table, associating a predetermined optimal one of the plurality of crop management tools 510A, 510B . . . 510N with a given action included in the crop management program and a preconfigured combination of preconfigured ranges of the properties and characteristics of the mushroom bed 400. And, as described above, the processor 210 may be operable otherwise to use the tool selection model 270 to predict an optimal one of the plurality of crop management tools 510A, 510B . . . 510N for performance of the action based on current mushroom bed data, such as a current mushroom bed state vector, generated by the mushroom bed model 260. As also described above, the processor 210 may be operable to use the tool selection model 270 or the outcome optimizer 282 to generate a confidence indicator of the selection generated by the tool selection model 270. When the confidence indictor is less than a preconfigured threshold value, the processor 210 may be operable to generate a tool selection request which encodes an action to be performed by the crop management program engine 222 in accordance with the crop management program and mushroom bed data characterizing a current state of the mushroom bed, which may be or include a current mushroom bed state vector generated by the mushroom bed model 260 as described. The processor 210 may then be operable to use the communications interface 240 to transmit to the tool selection request to the mushroom crop management tool coordinator 700, and the processor 710 of the mushroom crop management tool coordinator 700 may then use the communications interface 740 to receive it. The mushroom crop management tool coordinator 700 may store in the memory 720 a selection request processor 722 operable by the processor 710 to process the tool selection request.

In particular, the processor 710 may be operable to use the selection library manager 784 to determine whether the selection library datastore 732 stores predetermined tool selection data, which may be a record in a look-up table, associating a predetermined optimal one of the plurality of crop management tools 510A, 510B . . . 510N associated with a given action and a preconfigured combination of preconfigured ranges of the properties and characteristics of the mushroom bed 400 which overlaps or is similar within a preconfigured threshold to the current state of the mushroom bed as encoded in the tool selection request. If so, then the selection request processor 722 may be operable to generate a tool selection reply identifying the optimal one of the plurality of crop management tools 510A, 510B . . . 510N, and the processor 210 may be operable to use the communications interface 240 to communicate the tool selection reply to the robotic mushroom crop manager 100 which sent the tool selection request.

Alternatively, the processor 710 using the selection library manager 784 may determine that the selection library datastore 732 does not store predetermined tool selection data associating a predetermined optimal one of the plurality of crop management tools 510A, 510B . . . 510N with the given action and preconfigured combination of preconfigured ranges of the properties and characteristics of the mushroom bed 400 which overlaps or is similar within a preconfigured threshold to the current state of the mushroom bed as encoded in the tool selection request. In such case, the processor 710 may generate and operate a tool selection model 770 stored in the memory 720. The tool selection model 770 may be configured and operate substantially similarly to the tool selection model 270 of any one or more of the robotic mushroom crop manager 100, as described above. For this purpose, the tool selection request received from a robotic mushroom crop manager 100, as described above, may encode a mushroom bed state vector, and the processor 710 may be operable to use the tool selection model 770 to ingest the mushroom bed state vector and generate a predicted optimal tool selection, in substantially the same manner as described above with the tool selection model 270. The selection request processor 722 may then be operable to generate a tool selection reply identifying the predicted optimal one of the plurality of crop management tools 510A, 510B . . . 510N, and the processor 210 may be operable to use the communications interface 240 to communicate the tool selection reply to the robotic mushroom crop manager 100 which sent the tool selection request. The processor 710 may also be operable to store in a pending datastore 734 in the storage 730 a record of the optimal tool selection predicted by the tool selection model 770, in association with the tool selection request encoding the mushroom bed state vector used by the tool selection model 770 to generate the predicted optimal tool selection. The stored predicted tool selection record may be used later to train the tool selection model 770, as further described below.

In either case, the processor 210 of the robotic mushroom crop manager 100 that sent the tool selection request may use the communications interface 240 to receive the tool selection reply. The processor 210 may be operable, which may be using the crop management program engine 222—when a tool selection request has been communicated to the mushroom crop management tool coordinator 700 as described above—to wait for a preconfigured waiting period before performing the action required by the crop management program. The preconfigured waiting period may have any suitable duration, and in different embodiments may be 1 second to 5 minutes (300 seconds), or 2 seconds to 2 minutes (120 seconds), or about 2 seconds. If the tool selection reply is not received by the robotic mushroom crop manager 100 within that preconfigured waiting period, then the processor 210 may be operable to perform the action as described above, which may be to perform the action using the one of the plurality of crop management tools 510A, 510B . . . 510N determined by the tool selection model 270 regardless of the confidence indicator of the selection generated by the tool selection model 270. Alternatively, if the tool selection reply is not received by the robotic mushroom crop manager 100 within that preconfigured waiting period, then the processor 210 may be operable to perform a next action in the crop management program-that is, to skip the first action, and this may include modification of the crop management program to perform the skipped action at a later time or a later position in the sequence of actions in the crop management program. If the tool selection reply is received by the robotic mushroom crop manager 100 within the preconfigured waiting period, however, then the processor 210 may be operable, which may be using the crop management program engine 222, to perform the action using the one of the plurality of crop management tools 510A, 510B . . . 510N identified in the tool selection reply.

If the tool selection reply was generated by the mushroom crop management tool coordinator 700 based on predetermined tool selection data in its selection library datastore 732, as described above, then the tool selection reply may encode an indicator of such, and once the tool selection reply is received by the robotic mushroom crop manager 100, the processor 210 may be further operable to use the selection library manager 284 to generate and store in the selection library datastore 234 predetermined tool selection data based on the tool selection reply.

If the tool selection reply was generated by the mushroom crop management tool coordinator 700 using the tool selection model 770, as described above, then the tool selection reply may encode an indicator of such. The processor 210 of the robotic mushroom crop manager 100 may then be operable to generate tool selection feedback identifying the selected one of the plurality of crop management tools 510A, 510B . . . 510N identified in the tool selection reply and encoding the post-action mushroom bed state. The processor 210 may then be operable to use the communications interface 240 to transmit the tool selection feedback to the mushroom crop management tool coordinator 700, whose processor 710 may then use the communications interface 740 to receive it. The processor 710 may then use the received tool selection feedback to train the tool selection model 770 in substantially the same way as the processor 210 trains the tool selection model 270 as described above, and in particular by using the comparer 780 and outcome optimizer 782 stored in the memory 720, which are substantially similar to, and function in substantially the same way, as the comparer 280 and outcome optimizer 282 as described above.

In particular, the processor 710 may be operable to train the tool selection model 770 using any suitable techniques known in the art. A network architecture or topology may be established, and layers may be added which are associated with respective optimization functions, activation functions, and/or loss functions. One or more artificial neural networks may be used, and each may of any suitable type, including without limitation convolutional neural networks, recurrent neural networks, and deep learning neural networks. The tool selection model 770 may involve one or more of the same artificial neural networks, or may involve different artificial neural networks. The tool selection model 770 may include instructions using supervised or unsupervised machine learning, involving identifying and recognizing patterns in the mushroom bed data (in the form of the mushroom bed data vectors) to enable recognition of mushroom bed states of the mushroom bed, and to enable prediction of a selected crop management tool to produce an optimal actual outcome. The mushroom bed data, used to generate mushroom bed state vectors as described, and the differences between the actual and desired outcomes described herein which may be used to train the artificial neural network may be encoded in any suitable manner, such as, without limitation, an N-dimensional tensor, a matrix, or an array. Training may be performed in any suitable manner, and may include iterative training using labeled training data as described herein. Training of the artificial neural network may involve parameters initialized to random values, which are changed with each iteration, using any appropriate algorithm to converge to predetermined values. Such algorithms may include, for example, gradient descent, stochastic gradient descent (SGD), minibatch SGD, nonlinear conjugate gradient, limited-memory Broyden-Fletcher-Goldfarb-Shanno (L-BFGS), or Levenberg-Marquardt (LMA) algorithms. Training of the artificial neural network may employ any appropriate statistical model, which may be a multinomial logistic regression model, a random forest model, a decision tree, a logistic regression model, or a gradient boosting model.

In substantially the same way as described above, the selection library manager 784 of the mushroom crop management tool coordinator 700 may be operable by the processor 710 to determine when, for a given predicted optimal tool selection of the plurality of crop management tools 510A, 510B . . . 510N generated by the tool selection model 770, an optimal tool selection threshold is met for a given action in the crop management program and given preconfigured ranges of the properties and characteristics of the mushroom bed 400, which may be preconfigured ranges of dimensions of a current mushroom bed state vector, and to generate and store in the selection library datastore 732 predetermined tool selection data, which may be a record in a look-up table, associating the predicted optimal one of the plurality of crop management tools 510A, 510B . . . 510N with the action included in the crop management program and the preconfigured combination of preconfigured ranges of the properties and characteristics of the mushroom bed 400. In such case, the processor 710 may be further operable, which may be by using the selection request processor 722 or the library submission processor 724, to generate a library addition instruction encoding the predicted optimal one of the plurality of crop management tools 510A, 510B . . . 510N with the action included in the crop management program and the preconfigured combination of preconfigured ranges of the properties and characteristics of the mushroom bed 400. The processor 710 may then be operable to use the communications interface 740 to communicate the library addition instruction to one or more, which may be all, of the robotic mushroom crop managers 100A, 100B . . . 100N, whose processor 210 may be operable to use the communications interface 240 to receive it, and to use the selection library manager 284 to store in the selection library 234 corresponding predetermined tool selection data.

Figure 9:
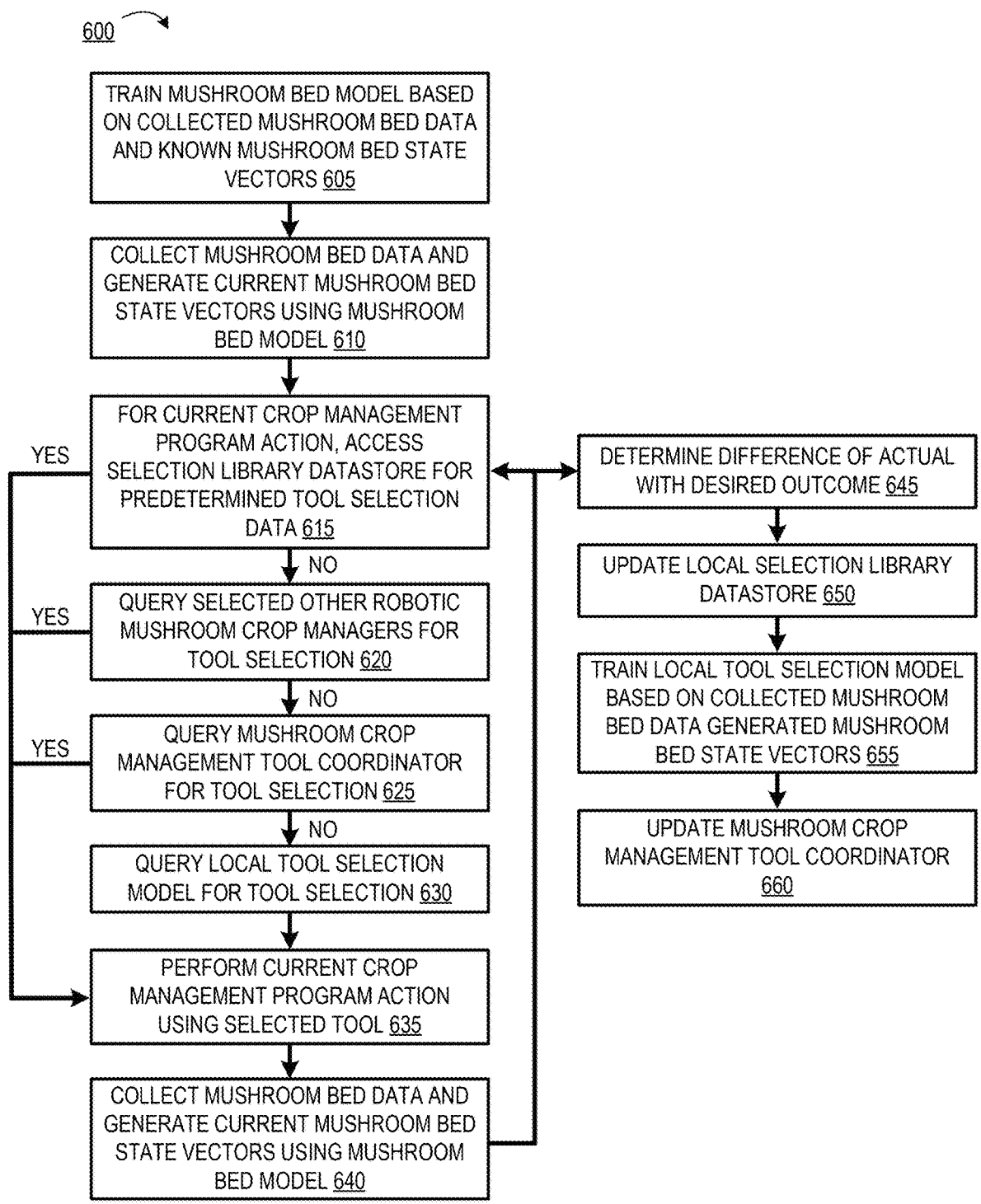
FIG. 9 is a flowchart of a method performable by one or more of the robotic mushroom crop managers of FIG. 2 and/or the automated mushroom crop management system of FIG. 1.
Figure 10:
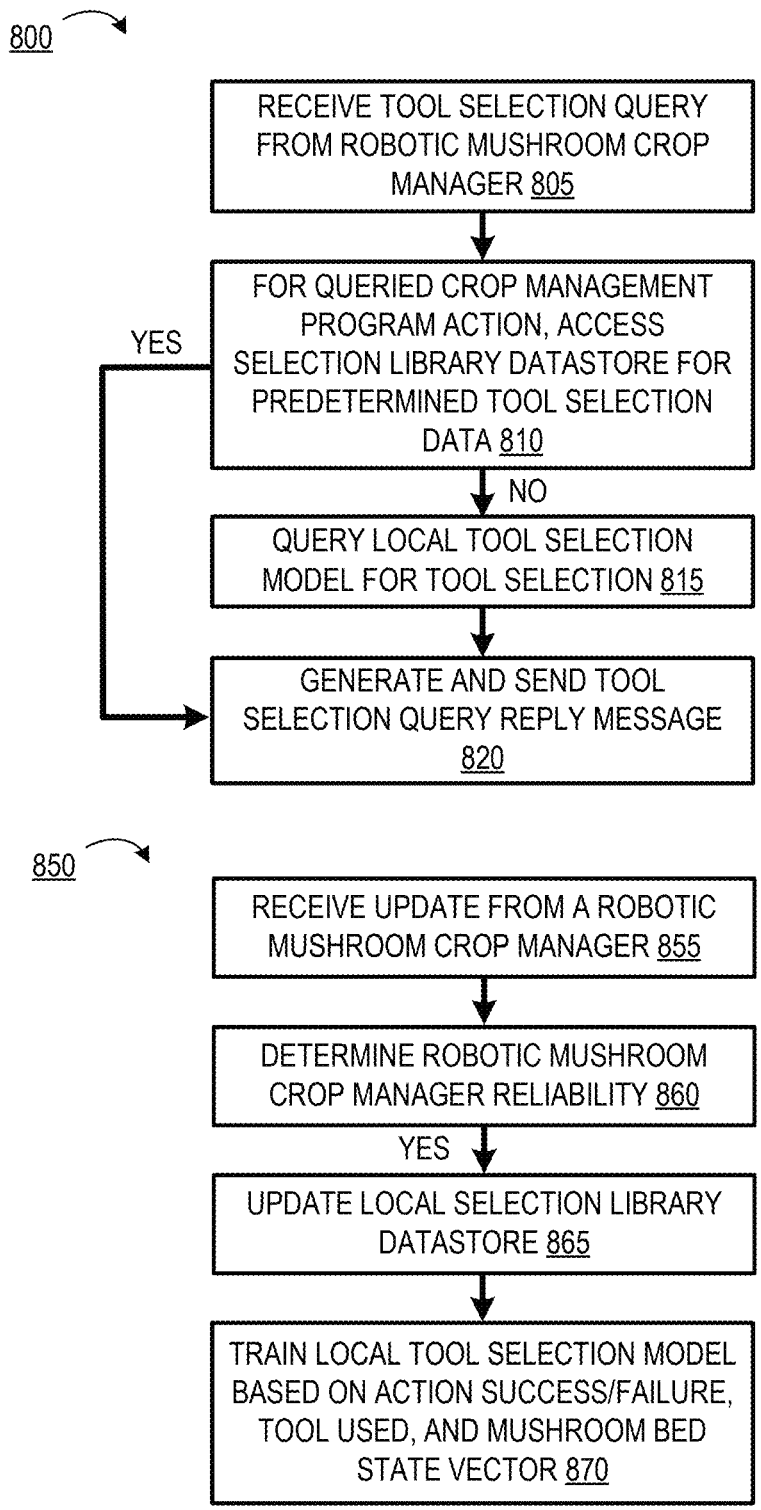
FIG. 10 is a flowchart of a method performable by the mushroom crop management tool coordinator of FIG. 8 and/or the automated mushroom crop management system of FIG. 1.

Thus, in accordance with the foregoing, a method 600 performable by the robotic mushroom crop manager controller 200 is shown in FIG. 9. The robotic mushroom crop manager controller 200 may train a mushroom bed model 260 based on collected mushroom bed data and known mushroom bed state vectors in order to recognize properties and characteristics of the mushroom bed 400 including properties and characteristics of mushrooms 410 and optionally growth medium 420 (step 605). The robotic mushroom crop manager controller 200 may collect mushroom bed data and generate current mushroom bed state vectors using the mushroom bed model 260 (step 610). The robotic mushroom crop manager controller 200 may perform a crop management program including a sequence of actions to be performed by a crop management device 310, wherein each action is performed using a selected crop management tool 510 from a plurality of crop management tools 510A, 510B . . . 510N. For each action, the robotic mushroom crop manager controller 200 may access a selection library datastore 234 storing a record encoding predetermined tool selection data associating a predetermined optimal one of the plurality of crop management tools 510A, 510B . . . 510N with the current action and a preconfigured combination of preconfigured ranges of the properties and characteristics of the mushroom bed 400 corresponding to the current mushroom bed state vector (step 615). If such case, the robotic mushroom crop manager controller 200 may cause the crop management device 310 to select that one of the plurality of crop management tools 510A, 510B . . . 510N and perform the current action on the mushroom bed 400 (step 635). Otherwise, the robotic mushroom crop manager controller 200 may query selected other robotic mushroom crop managers 100A, 100B . . . 100N for a tool selection (step 620). If at least one other robotic mushroom crop managers 100A, 100B . . . 100N replies with such a tool selection, then the robotic mushroom crop manager controller 200 may cause the crop management device 310 to select that one of the plurality of crop management tools 510A, 510B . . . 510N and perform the current action on the mushroom bed 400 (step 635). Otherwise, the robotic mushroom crop manager controller 200 may query the crop management tool coordinator 700 for a tool selection (step 625). If it replies with such a tool selection, then the robotic mushroom crop manager controller 200 may cause the crop management device 310 to select that one of the plurality of crop management tools 510A, 510B . . . 510N and perform the current action on the mushroom bed 400 (step 635). Otherwise, the robotic mushroom crop manager controller 200 may query a local tool selection model 270 for a tool selection (step 630), and then cause the crop management device 310 to select that one of the plurality of crop management tools 510A, 510B . . . 510N and perform the current action on the mushroom bed 400 (step 635). The robotic mushroom crop manager controller 200 may then proceed to perform the next action in the sequences of actions of the crop management program. In addition, the robotic mushroom crop manager controller 200 may also determine a difference between of the actual outcome of the action with a desired outcome (step 645). Based on this difference, the robotic mushroom crop manager controller 200 may update its local selection library datastore 234 (step 650), train its local tool selection model (step 655), and update the mushroom crop management tool coordinator 700 (step 660).

A method 800 may be performable by the mushroom crop management tool coordinator 700. The mushroom crop management tool coordinator 700 may receive using the communications interface 740 a tool selection query from one of the robotic mushroom crop managers 100A, 100B . . . 100N for a tool selection (step 805). The processor 710 may use the selection request processor 722 to process the selection query. The processor 710 may use the selection library manager 784 to access the selection library datastore 732 for predetermined tool selection data (step 810). In particular, the processor 710 query, which may be by using the selection library manager 784, to query the selection library datastore 732 stored in the storage 730 for a record encoding predetermined tool selection data associating a predetermined optimal one of the plurality of crop management tools 510A, 510B . . . 510N with the current action encoded in the tool selection query and a preconfigured combination of preconfigured ranges of mushroom bed properties and characteristics corresponding to a current mushroom bed state vector encoded in the selection query. If such case, the processor 710 may generate, which may be by using the selection request processor 722, a tool selection query reply message encoding the optimal tool selection, and may use the communications interface 740 to communicate the tool selection query reply message to the requesting one of the robotic mushroom crop managers 100A, 100B . . . 100N. Otherwise, the processor 710 may query a local tool selection model 770 for a tool selection (step 815), and then generate and communicate a tool selection query reply message to the requesting one of the robotic mushroom crop managers 100A, 100B . . . 100N as described above (step 820). Concurrently or contemporaneously with the foregoing, a method 850 may be performable by the mushroom crop management tool coordinator 700. The the mushroom crop management tool coordinator 700 may receive, which may be by the processor 710 using the communications interface 840, an update message from one of the one of the robotic mushroom crop managers 100A, 100B . . . 100N (step 855). The update message may encode a library submission request, as described above, or tool selection feedback, as described above. The processor 710 may process the update message to determine whether it encodes a library submission request or tool selection feedback. The processor 710 may determine, which may be by using the library submission processor 724, a reliability of the sending one of the robotic mushroom crop managers 100A, 100B . . . 100N (step 860), and if the reliability is determined to meet or exceed a preconfigured threshold, the processor 710 may use the selection library manager 784 to generate and store in the selection library datastore 732 a record encoding predetermined tool selection data associating the one of the plurality of crop management tools 510A, 510B . . . 510N, the action performed, and the current mushroom bed state vector encoded in the library submission request (step 865). The processor 710 may also use the comparer 780 and the outcome optimizer 782 to train the tool selection model 770 based on the tool selection feedback message, as described above, where the tool selection feedback message encodes the action performed, the one of the plurality of crop management tools 510A, 510B . . . 510N used to perform the action, the current mushroom bed state vector, and a difference between of the actual outcome of the action with a desired outcome (step 870).

In this way, the automated mushroom crop management system 000, including the plurality of robotic mushroom crop managers 100A, 100B . . . 100N and the mushroom crop management tool coordinator 700 may be operable collectively to train the tool selection model 770 of the mushroom crop management tool coordinator 700, and to distribute and share amongst all of the robotic mushroom crop managers 100A, 100B . . . 100N optimal selections of the plurality of crop management tools 510A, 510B . . . 510N for the performance of any one or more crop management program actions performable by crop management equipment 300 of the plurality of robotic mushroom crop managers 100A, 100B . . . 100N, while at the same time optimizing time required to determine the optimal tool selection in any particular case, and optimizing training of automated mushroom crop management system 000 for the determination of such optimal tool selections collectively.

The robotic mushroom crop manager controller 200 of each of the robotic mushroom crop managers 100A, 100B . . . 100N, and the mushroom crop management tool coordinator 700, may include any computing and related communications and interface technology useful to perform the functions described herein. Such technology may include one or more computers, one or more servers, a group or groups of multiple servers, or one or mobile computing devices. Each of these may include or use further processing or communications technologies, which may include any number of processors and processor types, such as CPUs, one or more graphics processing units (GPUs), digital signal processors (DSPs), and so forth. In general, each such processor (including processors 210,710) is operable to execute or perform instructions stored in a memory, including memories 220,720, respectively. Such memory may include or interface persistent memories, such as storage 230,730. Each such processor may use any communications technology, including communications interfaces 240,740, which may include network interface controllers (NICs), which may be wired or wireless controllers, operable to perform communication over a network, including network 900, which may be or include the Internet. The robotic mushroom crop manager controller 200 of any one or more of the robotic mushroom crop managers 100A, 100B . . . 100N, and in particular the mushroom crop management tool coordinator 700, may include or be implemented in part or in whole in a cloud computing environment, including without limitation Amazon AWS™ or Microsoft Azure™.

The following are non-limiting embodiments of the disclosed subject-matter.

Embodiment 1. A robotic mushroom crop manager comprising: at least one processor; a communications interface; and at least one computer-readable medium storing instructions executable by the at least one processor to cause the robotic mushroom crop manager: to periodically or continuously receive mushroom bed data corresponding to a mushroom bed including growing mushrooms at a plurality of times; to use a trained mushroom bed model to process the mushroom bed data to generate mushroom bed state vectors respectively characterizing corresponding states of the mushroom bed at the plurality of times; to control crop management equipment to perform a crop management program comprising a sequence of actions to be performed by the crop management equipment comprising, for each current action in the sequence of actions, selecting, based on corresponding a current mushroom bed state vector, a selected crop management tool from a plurality of crop management tools; and to control the crop management equipment to use the selected crop management tool to perform the current action on the mushroom bed.

Embodiment 2. The robotic mushroom crop manager of Embodiment 1, wherein selecting the selected crop management tool comprises: accessing a selection library datastore storing predetermined tool selection data associating predetermined optimal ones of the plurality of crop management tools with respectively corresponding combinations of actions in the crop management program and preconfigured ranges of the mushroom bed state vectors; for the current action, determining whether the selection library datastore stores predetermined tool selection data wherein the current mushroom bed state vector is similar to one of the preconfigured ranges of the mushroom bed state vectors within a preconfigured threshold; and when, for the current action, the selection library datastore stores predetermined tool selection data wherein the current mushroom bed state vector is similar to one of the preconfigured ranges of the mushroom bed state vectors within the preconfigured threshold, using as the selected crop management tool to perform the current action the optimal one of the plurality of crop management tools identified by the predetermined tool selection data.

Embodiment 3. The robotic mushroom crop manager of Embodiment 2, wherein selecting the selected crop management tool further comprises: when, for the current action, the selection library datastore is free from predetermined tool selection data wherein the current mushroom bed state vector is similar to one of the preconfigured ranges of the mushroom bed state vectors within the preconfigured threshold, accessing a robotic mushroom crop manager (RMCM) list datastore storing records corresponding respectively to one or more other similar robotic mushroom crop managers, each record storing an identifier and a communication address of the corresponding other similar robotic mushroom crop manager, and selecting one of the other similar robotic mushroom crop managers based on preconfigured selection parameters; generating a tool selection request message encoding in association the current action and the current mushroom bed state vector, and using the communications interface to communicate the tool selection request message to the communication address of the selected one of the other similar robotic mushroom crop managers; when, for the current action, the robotic mushroom crop manager receives from the selected other similar robotic mushroom manager a tool selection reply message corresponding to the tool selection request message encoding an optimal tool selection, using as the selected crop management tool to perform the current action the optimal one of the plurality of crop management tools identified by the tool selection reply message.

Embodiment 4. The robotic mushroom crop manager of Embodiment 3, wherein selecting the selected crop management tool further comprises: when, for the current action, the robotic mushroom crop manager does not receive from the selected other similar robotic mushroom manager the tool selection reply message corresponding to the tool selection request message encoding an optimal tool selection within a preconfigured interval, generating a further tool selection request message encoding in association the current action and the current mushroom bed state vector, and using the communications interface to communicate the further tool selection request to a remote crop management tool coordinator; and when, for the current action, the robotic mushroom crop manager receives from the crop management tool coordinator a tool selection reply message corresponding to the further tool selection request message encoding an optimal tool selection, using as the selected crop management tool to perform the current action the optimal one of the plurality of crop management tools identified by the tool selection reply message.

Embodiment 5. The robotic mushroom crop manager of Embodiment 4, wherein selecting the selected crop management tool further comprises: when, for the current action, the robotic mushroom crop manager does not receive from the crop management tool coordinator the tool selection reply message corresponding to the tool selection request message encoding an optimal tool selection within a further preconfigured interval, using a local trained tool selection model to generate based on the current mushroom bed state vector the selected one of the plurality of crop management tools.

Embodiment 6. The robotic mushroom crop manager of Embodiment 5, wherein the at least one computer-readable medium further stores instructions executable by the at least one processor to cause the robotic mushroom crop manager: for each current action, to compare a pre-action mushroom bed state vector corresponding to a first time before performance of the current action with a post-action mushroom bed state vector corresponding to a second time after performance of the current action to determine an actual outcome of the current action; to compare the actual outcome of the current action with a predefined desired outcome of the current action based on predefined parameters of the mushroom bed in accordance with the crop management program; and when the actual outcome is similar to the desired outcome within a predefined threshold, to store in the selection library datastore predetermined tool selection data associating the selected one of the plurality of crop management tools used to perform the current action on the mushroom bed with the current action and the pre-action mushroom bed state vector.

Embodiment 7. The robotic mushroom crop manager of Embodiment 6, wherein the at least one computer-readable medium further stores instructions executable by the at least one processor to cause the robotic mushroom crop manager: when the actual outcome is similar to the desired outcome within the preconfigured threshold, to train the local tool selection model based on the current action on the mushroom bed and the pre-action mushroom bed state vector.

Embodiment 8. The robotic mushroom crop manager of Embodiment 7, wherein the at least one computer-readable medium further stores instructions executable by the at least one processor to cause the robotic mushroom crop manager: when the actual outcome is similar to the desired outcome within the preconfigured threshold, to generate an update message encoding the selected one of the plurality of crop management tools used to perform the current action on the mushroom bed and the pre-action mushroom bed state vector; and to use the communications interface to communicate the update message to the crop management tool coordinator.

Embodiment 9. The robotic mushroom crop manager of any one of Embodiments 1 to 8 comprising: a controller comprising: the at least one processor; the communications interface; and the at least one computer-readable medium; and the crop management device comprising: a crop management device operable to perform the sequence of actions on the mushroom bed; and sensors operable to collect the mushroom bed data, the sensors comprising at least one optimal imager operable to collect images of the mushroom bed.

Embodiment 10. The robotic mushroom crop manager of Embodiment 9, wherein: the crop management device comprises a robotic arm comprising an end effector operable to selectively couple with each of the plurality of crop management tools to perform each current action using the corresponding selected crop management tool; the at least one optimal imager comprises: a harvesting imager mounted at an underside of the robotic arm proximal the end effector and operable to collect harvesting imager images of a plan or overhead view of the mushroom bed beneath the end effector; a trimming imager mounted at or proximal the robotic arm and oriented and operable to collect trimming imager images of an elevation, side, or perspective view of the end effector and the mushroom bed adjacent the end effector; and the mushroom bed data comprises the harvesting imager images and the trimming imager images.

Embodiment 11. The robotic mushroom crop manager of Embodiment 10, wherein: the current action comprises harvesting a selected one of the mushrooms; the pre-action mushroom bed state vector is generated based on harvesting imager images of the selected mushroom collected before harvesting of the selected mushroom using the selected one of the crop management tools; the post-action mushroom bed state vector is generated based on harvesting imager images of the selected mushroom after harvesting of the selected mushroom using the selected one of the crop management tools; and the desired outcome comprises a maximum degree of damage to a cap or stem of the selected mushroom.

Embodiment 12. The robotic mushroom crop manager of Embodiment 11, wherein: the desired outcome further comprises a maximum degree of damage to a cap or stem of other ones of the mushrooms proximal the selected mushroom in the mushroom bed.

Embodiment 13. The robotic mushroom crop manager of Embodiment 12, wherein: the desired outcome further comprises a maximum degree of disturbance to growing medium in the mushroom bed proximal the selected mushroom.

Embodiment 14. The robotic mushroom crop manager of any one of Embodiments 1 to 13, wherein: at least some of the crop management tools comprise suction harvesters operable to apply suction to respective heads of at least some of the mushrooms to lift the mushrooms during harvesting.

Embodiment 15. An automated mushroom crop management system comprising: a plurality of the robotic mushroom crop managers as defined in Embodiment 4 or any one of Embodiments 5 to 14 when dependent on Embodiment 4; and the remote crop management tool coordinator as defined in Embodiment 4, wherein the crop management tool coordinator comprises: at least one further processor; a further communications interface; and at least one further computer-readable medium storing instructions executable by the at least one further processor to cause the crop management tool coordinator: to use the further communications interface to receive the further tool selection request from a requesting robotic mushroom crop manager; to access a further selection library datastore storing predetermined tool selection data associating predetermined optimal ones of the plurality of crop management tools with respectively corresponding actions in the crop management program and preconfigured ranges of the mushroom bed state vectors; for the current action, to determine whether the further selection library datastore stores predetermined tool selection data wherein the current mushroom bed state vector is similar to the preconfigured ranges of the mushroom bed state vectors within a preconfigured threshold; and when, for the current action, the further selection library datastore stores predetermined tool selection data wherein the current mushroom bed state vector is similar to the preconfigured ranges of the mushroom bed state vectors within the preconfigured threshold, to generate the tool selection reply message encoding the optimal tool selection, and using the further communications interface to communicate the tool selection reply message to the requesting robotic mushroom crop manager.

Embodiment 16. The automated mushroom crop management system of Embodiment 15, wherein the at least one further computer-readable medium further stores instructions executable by the at least one further processor to cause the crop management tool coordinator: when, for the current action, the further selection library datastore does not store predetermined tool selection data wherein the current mushroom bed state vector is similar to the preconfigured ranges of the mushroom bed state vectors within a preconfigured threshold, to use a further local trained tool selection model to generate the optimal tool selection based on the current mushroom bed state vector; to generate the tool selection reply message encoding the optimal tool selection; and to use the further communications interface to communicate the tool selection reply message to the requesting robotic mushroom crop manager.

Embodiment 17. The automated mushroom crop management system of Embodiment 16, wherein the at least one further computer-readable medium further stores instructions executable by the at least one further processor to cause the crop management tool coordinator: to store in the further selection library datastore predetermined tool selection data associating the selected one of the plurality of crop management tools used to perform the current action on the mushroom bed with the current action and the pre-action mushroom bed state vector.

Embodiment 18. The automated mushroom crop management system of Embodiment 17, wherein the at least one further computer-readable medium further stores instructions executable by the at least one further processor to cause the crop management tool coordinator: to train the further local tool selection model based on the current action on the mushroom bed and the pre-action mushroom bed state vector.

Embodiment 19. A method performed by at least one processor of a robotic mushroom crop manager, the robotic mushroom crop manager comprising a communications interface, the method comprising: periodically or continuously receiving mushroom bed data corresponding to a mushroom bed including growing mushrooms at a plurality of times; using a trained mushroom bed model to process the mushroom bed data to generate mushroom bed state vectors respectively characterizing corresponding states of the mushroom bed at the plurality of times; and controlling crop management equipment to perform a crop management program comprising a sequence of actions to be performed by crop management equipment comprising, for each current action in the sequence of actions: selecting, based on a corresponding a current mushroom bed state vector, a selected crop management tool from a plurality of crop management tools; and controlling the crop management equipment to use the selected crop management tool to perform the current action on the mushroom bed.

Embodiment 20. The method of Embodiment 19, wherein selecting the selected crop management tool comprises: accessing a selection library datastore storing predetermined tool selection data associating predetermined optimal ones of the plurality of crop management tools with respectively corresponding combinations of actions in the crop management program and preconfigured ranges of the mushroom bed state vectors; for the current action, determining whether the selection library datastore stores predetermined tool selection data wherein the current mushroom bed state vector is similar to one of the preconfigured ranges of the mushroom bed state vectors within a preconfigured threshold; and when, for the current action, the selection library datastore stores predetermined tool selection data wherein the current mushroom bed state vector is similar to one of the preconfigured ranges of the mushroom bed state vectors within the preconfigured threshold, using as the selected crop management tool to perform the current action the optimal one of the plurality of crop management tools identified by the predetermined tool selection data.

Embodiment 21. The method of Embodiment 20, wherein selecting the selected crop management tool further comprises: when, for the current action, the selection library datastore is free from predetermined tool selection data wherein the current mushroom bed state vector is similar to one of the preconfigured ranges of the mushroom bed state vectors within the preconfigured threshold, accessing a robotic mushroom crop manager (RMCM) list datastore storing records corresponding respectively to one or more other similar robotic mushroom crop managers, each record storing an identifier and a communication address of the corresponding other similar robotic mushroom crop manager, and selecting one of the other similar robotic mushroom crop managers based on preconfigured selection parameters; generating a tool selection request message encoding in association the current action and the current mushroom bed state vector, and using the communications interface to communicate the tool selection request message to the communication address of the selected one of the other similar robotic mushroom crop managers; when, for the current action, the robotic mushroom crop manager receives from the selected other similar robotic mushroom manager a tool selection reply message corresponding to the tool selection request message encoding an optimal tool selection, using as the selected crop management tool to perform the current action the optimal one of the plurality of crop management tools identified by the tool selection reply message.

Embodiment 22. The method of Embodiment 21, wherein selecting the selected crop management tool further comprises: when, for the current action, the robotic mushroom crop manager does not receive from the selected other similar robotic mushroom manager the tool selection reply message corresponding to the tool selection request message encoding an optimal tool selection within a preconfigured interval, generating a further tool selection request message encoding in association the current action and the current mushroom bed state vector, and using the communications interface to communicate the further tool selection request to a remote crop management tool coordinator; and when, for the current action, the robotic mushroom crop manager receives from the crop management tool coordinator a tool selection reply message corresponding to the further tool selection request message encoding an optimal tool selection, using as the selected crop management tool to perform the current action the optimal one of the plurality of crop management tools identified by the tool selection reply message.

Embodiment 23. The method of Embodiment 22, wherein selecting the selected crop management tool further comprises: when, for the current action, the robotic mushroom crop manager does not receive from the crop management tool coordinator the tool selection reply message corresponding to the tool selection request message encoding an optimal tool selection within a further preconfigured interval, using a local trained tool selection model to generate based on the current mushroom bed state vector the selected one of the plurality of crop management tools.

Embodiment 24. The method of Embodiment 23 further comprising: for each current action, comparing a pre-action mushroom bed state vector corresponding to a first time before performance of the current action with a post-action mushroom bed state vector corresponding to a second time after performance of the current action to determine an actual outcome of the current action; comparing the actual outcome of the current action with a predefined desired outcome of the current action based on predefined parameters of the mushroom bed in accordance with the crop management program; and when the actual outcome is similar to the desired outcome within a predefined threshold, storing in the selection library datastore predetermined tool selection data associating the selected one of the plurality of crop management tools used to perform the current action on the mushroom bed with the current action and the pre-action mushroom bed state vector.

Embodiment 25. The method of Embodiment 24 further comprising: when the actual outcome is similar to the desired outcome within the preconfigured threshold, training the local tool selection model based on the current action on the mushroom bed and the pre-action mushroom bed state vector.

Embodiment 26. The method of Embodiment 25 further comprising: when the actual outcome is similar to the desired outcome within the preconfigured threshold, generating an update message encoding the selected one of the plurality of crop management tools used to perform the current action on the mushroom bed and the pre-action mushroom bed state vector; and using the communications interface to communicate the update message to the crop management tool coordinator.

Embodiment 27. The method of any one of Embodiments 19 to 26, wherein the robotic mushroom crop manager comprises: a controller comprising: the at least one processor; the communications interface; and the at least one computer-readable medium; and the crop management device comprising: a crop management device operable to perform the sequence of actions on the mushroom bed; and sensors operable to collect the mushroom bed data, the sensors comprising at least one optimal imager operable to collect images of the mushroom bed.

Embodiment 28. The method of Embodiment 27, wherein: the crop management device comprises a robotic arm comprising an end effector operable to selectively couple with each of the plurality of crop management tools to perform each current action using the corresponding selected crop management tool; the at least one optimal imager comprises: a harvesting imager mounted at an underside of the robotic arm proximal the end effector and operable to collect harvesting imager images of a plan or overhead view of the mushroom bed beneath the end effector; a trimming imager mounted at or proximal the robotic arm and oriented and operable to collect trimming imager images of an elevation, side, or perspective view of the end effector and the mushroom bed adjacent the end effector; and the mushroom bed data comprises the harvesting imager images and the trimming imager images.

Embodiment 29. The method of Embodiment 28, wherein: the current action comprises harvesting a selected one of the mushrooms; the pre-action mushroom bed state vector is generated based on harvesting imager images of the selected mushroom collected before harvesting of the selected mushroom using the selected one of the crop management tools; the post-action mushroom bed state vector is generated based on harvesting imager images of the selected mushroom after harvesting of the selected mushroom using the selected one of the crop management tools; and the desired outcome comprises a maximum degree of damage to a cap or stem of the selected mushroom.

Embodiment 30. The method of Embodiment 29, wherein: the desired outcome further comprises a maximum degree of damage to a cap or stem of other ones of the mushrooms proximal the selected mushroom in the mushroom bed.

Embodiment 31. The method of Embodiment 30, wherein: the desired outcome further comprises a maximum degree of disturbance to growing medium in the mushroom bed proximal the selected mushroom.

Embodiment 32. The method of any one of Embodiment 19 to 31, wherein: at least some of the crop management tools comprise suction harvesters operable to apply suction to respective heads of at least some of the mushrooms to lift the mushrooms during harvesting.

Embodiment 33. The method of Embodiment 22 or any one of Embodiments 23 to 32 when dependent on Embodiment 22, wherein the crop management tool coordinator comprises a further communications interface, the method further comprising, at the crop management tool coordinator: using the further communications interface to receive the further tool selection request from a requesting robotic mushroom crop manager; accessing a further selection library datastore storing predetermined tool selection data associating predetermined optimal ones of the plurality of crop management tools with respectively corresponding actions in the crop management program and preconfigured ranges of the mushroom bed state vectors; for the current action, to determine whether the further selection library datastore stores predetermined tool selection data wherein the current mushroom bed state vector is similar to the preconfigured ranges of the mushroom bed state vectors within a preconfigured threshold; and when, for the current action, the further selection library datastore stores predetermined tool selection data wherein the current mushroom bed state vector is similar to the preconfigured ranges of the mushroom bed state vectors within the preconfigured threshold, to generate the tool selection reply message encoding the optimal tool selection, and using the further communications interface to communicate the tool selection reply message to the requesting robotic mushroom crop manager.

Embodiment 34. The method of Embodiment 33 further comprising, at the crop management tool coordinator: when, for the current action, the further selection library datastore does not store predetermined tool selection data wherein the current mushroom bed state vector is similar to the preconfigured ranges of the mushroom bed state vectors within a preconfigured threshold, using a further local trained tool selection model to generate the optimal tool selection based on the current mushroom bed state vector; generating the tool selection reply message encoding the optimal tool selection; and using the further communications interface to communicate the tool selection reply message to the requesting robotic mushroom crop manager.

Embodiment 35. The method of Embodiment 34 further comprising, at the crop management tool coordinator: storing in the further selection library datastore predetermined tool selection data associating the selected one of the plurality of crop management tools used to perform the current action on the mushroom bed with the current action and the pre-action mushroom bed state vector.

Embodiment 36. The method of Embodiment 35, further comprising, at the crop management tool coordinator: training the further local tool selection model based on the current action on the mushroom bed and the pre-action mushroom bed state vector.

Embodiment 37. A computer-readable medium storing instructions executable by the at least one processor to perform the method of any one of Embodiments 19 to 36.

So that the present disclosure may be more readily understood, certain terms are defined. Unless defined otherwise, all technical and scientific terms used herein have the same meaning as commonly understood by one of ordinary skill in the art to which embodiments of the invention pertain. While many methods and materials similar, modified, or equivalent to those described herein can be used in the practice of the embodiments of the present invention without undue experimentation, the preferred materials and methods are described herein.

All terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6, and decimals and fractions, for example, 1.2, 3.8, 1½, and 4¾. This applies regardless of the breadth of the range.

The terms "about" or "approximately" as used herein refer to variation in the numerical quantity that can occur, for example, through typical measuring techniques and equipment, with respect to any quantifiable variable, including, but not limited to, mass, volume, time, distance, voltage, and current. Further, given solid and liquid handling procedures used in the real world, there is certain inadvertent error and variation that is likely through differences in the manufacture, source, or purity of the ingredients used to make the compositions or carry out the methods and the like. The terms "about" and "approximately" also encompass these variations. Expressions which combine the terms "about" or "approximately" with one or more bounds of a range refer to a union of the bound modified by the term "about" or "approximately" as described above, and the range having the unmodified bound. Thus, for example, the expression "at least about X" means the union of "at least X" and "about X". Similarly, "at most about Y" means the union of "at most Y" and "about Y".

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of", or when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of". "Consisting essentially of", when used in the claims, shall have its ordinary meaning as used in the field of patent law.

Embodiments of the disclosed subject-matter are described herein using the auxiliary verb "may". When used herein, unless required otherwise by the context of usage, the auxiliary verb "may" designates an embodiment of the disclosed subject-matter which possesses the addressed object without requiring necessarily that any other embodiment of the disclosed subject-matter possesses the addressed object. Thus, a statement such as "X may include Y" indicates that the disclosed subject-matter includes embodiments where X includes Y, without requiring that all disclosed embodiments include Y, and without excluding any other embodiments which do not include Y.

While the disclosed subject-matter may be embodied in many different forms, there are described in detail herein specific embodiments. The present disclosure is an exemplification of the principles of the disclosed subject-matter and is not intended to limit the disclosed subject-matter to the particular embodiments illustrated. Furthermore, the disclosed subject-matter encompasses any possible combination of some or all of the various embodiments mentioned herein. In addition the disclosed subject-matter encompasses any possible combination that also specifically excludes any one or some of the various embodiments mentioned herein.

In some instances, well-known hardware and software components, modules, and functions are shown in block diagram form in order not to obscure the invention. For example, specific details are not provided as to whether the embodiments described herein are implemented as a software routine, hardware circuit, firmware, or a combination thereof.

Some of the embodiments described herein include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory.

Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A robotic mushroom crop manager comprising:
   at least one processor;
   a communications interface; and
   at least one computer-readable medium storing instructions executable by the at least one processor to cause the robotic mushroom crop manager:
   to periodically or continuously receive mushroom bed data corresponding to a mushroom bed including growing mushrooms at a plurality of times;
   to use a trained mushroom bed model to process the mushroom bed data to generate mushroom bed state vectors respectively characterizing corresponding states of the mushroom bed at the plurality of times;
   to control crop management equipment to perform a crop management program comprising a sequence of actions to be performed by the crop management equipment comprising, for each current action in the sequence of actions, selecting, based on a corresponding current mushroom bed state vector, a selected crop management tool from a plurality of crop management tools, wherein selecting the selected crop management tool comprises:
      accessing a selection library datastore storing predetermined tool selection data associating predetermined optimal ones of the plurality of crop management tools with respectively corresponding combinations of actions in the crop management program and preconfigured ranges of the mushroom bed state vectors;
      for the current action, determining whether the selection library datastore stores predetermined tool selection data wherein the current mushroom bed state vector falls within one of the preconfigured ranges of the mushroom bed state vectors; and
      when, for the current action, the selection library datastore stores predetermined tool selection data wherein the current mushroom bed state vector falls within one of the preconfigured ranges of the mushroom bed state vectors, using as the selected crop management tool to perform the current action the optimal one of the plurality of crop management tools identified by the predetermined tool selection data; and
   to control the crop management equipment to use the selected crop management tool to perform the current action on the mushroom bed.

2. The robotic mushroom crop manager of claim 1, wherein selecting the selected crop management tool further comprises:
   when, for the current action, the selection library datastore is free from predetermined tool selection data wherein the current mushroom bed state vector falls within one of the preconfigured ranges of the mushroom bed state vectors, accessing a robotic mushroom crop manager (RMCM) list datastore storing records corresponding respectively to one or more other like robotic mushroom crop managers, each record storing an identifier and a communication address of the corresponding other like robotic mushroom crop manager, and selecting one of the other like robotic mushroom crop managers based on preconfigured selection parameters;
   generating a tool selection request message encoding in association the current action and the current mushroom bed state vector, and using the communications interface to communicate the tool selection request message to the communication address of the selected one of the other like robotic mushroom crop managers;
   when, for the current action, the robotic mushroom crop manager receives from the selected other like robotic mushroom manager a tool selection reply message corresponding to the tool selection request message encoding an optimal tool selection, using as the selected crop management tool to perform the current action the optimal one of the plurality of crop management tools identified by the tool selection reply message.

3. The robotic mushroom crop manager of claim 2, wherein selecting the selected crop management tool further comprises:
   when, for the current action, the robotic mushroom crop manager does not receive from the selected other like robotic mushroom manager the tool selection reply message corresponding to the tool selection request message encoding an optimal tool selection within a preconfigured interval, generating a further tool selection request message encoding in association the current action and the current mushroom bed state vector, and using the communications interface to communicate the further tool selection request to a remote crop management tool coordinator; and
   when, for the current action, the robotic mushroom crop manager receives from the crop management tool coordinator a tool selection reply message corresponding to the further tool selection request message encoding an optimal tool selection, using as the selected crop management tool to perform the current action the optimal one of the plurality of crop management tools identified by the tool selection reply message.

4. The robotic mushroom crop manager of claim 3, wherein selecting the selected crop management tool further comprises:
   when, for the current action, the robotic mushroom crop manager does not receive from the crop management tool coordinator the tool selection reply message corresponding to the tool selection request message encoding an optimal tool selection within a further preconfigured interval, using a local trained tool selection model to generate based on the current mushroom bed state vector the selected one of the plurality of crop management tools.

5. The robotic mushroom crop manager of claim 4, wherein the at least one computer-readable medium further stores instructions executable by the at least one processor to cause the robotic mushroom crop manager:
   for each current action, to compare a pre-action mushroom bed state vector corresponding to a first time before performance of the current action with a post-action mushroom bed state vector corresponding to a second time after performance of the current action to determine an actual outcome of the current action;
   to compare the actual outcome of the current action with a predefined desired outcome of the current action based on predefined parameters of the mushroom bed in accordance with the crop management program; and
   when a difference between the actual outcome and the desired outcome falls within a predefined threshold, to store in the selection library datastore predetermined tool selection data associating the selected one of the plurality of crop management tools used to perform the current action on the mushroom bed with the current action and the pre-action mushroom bed state vector.

6. The robotic mushroom crop manager of claim 5, wherein the at least one computer-readable medium further stores instructions executable by the at least one processor to cause the robotic mushroom crop manager:

when a difference between the actual outcome and the desired outcome falls within the preconfigured threshold, to train the local tool selection model based on the current action on the mushroom bed and the pre-action mushroom bed state vector.

7. The robotic mushroom crop manager of claim 6, wherein the at least one computer-readable medium further stores instructions executable by the at least one processor to cause the robotic mushroom crop manager:

when a difference between the actual outcome and the desired outcome falls within the preconfigured threshold, to generate an update message encoding the selected one of the plurality of crop management tools used to perform the current action on the mushroom bed and the pre-action mushroom bed state vector; and to use the communications interface to communicate the update message to the crop management tool coordinator.

8. The robotic mushroom crop manager of claim 1 comprising:

a controller comprising:
the at least one processor;
the communications interface; and
the at least one computer-readable medium; and the crop management equipment comprising:
a crop management device operable to perform the sequence of actions on the mushroom bed; and
sensors operable to collect the mushroom bed data, the sensors comprising at least one optimal imager operable to collect images of the mushroom bed.

9. A robotic mushroom crop manager comprising:
at least one processor;
a communications interface; and
at least one computer-readable medium storing instructions executable by the at least one processor to cause the robotic mushroom crop manager:
to periodically or continuously receive mushroom bed data corresponding to a mushroom bed including growing mushrooms at a plurality of times;
to use a trained mushroom bed model to process the mushroom bed data to generate mushroom bed state vectors respectively characterizing corresponding states of the mushroom bed at the plurality of times;
to control crop management equipment to perform a crop management program comprising a sequence of actions to be performed by the crop management equipment comprising, for each current action in the sequence of actions, selecting, based on a corresponding current mushroom bed state vector, a selected crop management tool from a plurality of crop management tools; and
to control the crop management equipment to use the selected crop management tool to perform the current action on the mushroom bed;

a controller comprising:
the at least one processor;
the communications interface; and
the at least one computer-readable medium; and the crop management equipment comprising:
a crop management device operable to perform the sequence of actions on the mushroom bed; and
sensors operable to collect the mushroom bed data, the sensors comprising at least one optimal imager operable to collect images of the mushroom bed;

wherein:
the crop management device comprises a robotic arm comprising an end effector operable to selectively couple with each of the plurality of crop management tools to perform each current action using the corresponding selected crop management tool;
the at least one optimal imager comprises:
a harvesting imager mounted at an underside of the robotic arm adjacent the end effector and operable to collect harvesting imager images of a plan or overhead view of the mushroom bed beneath the end effector;
a trimming imager mounted at or adjacent the robotic arm and oriented and operable to collect trimming imager images of an elevation, side, or perspective view of the end effector and the mushroom bed adjacent the end effector; and
the mushroom bed data comprises the harvesting imager images and the trimming imager images.

10. The robotic mushroom crop manager of claim 9, wherein:
the current action comprises harvesting a selected one of the mushrooms;
the pre-action mushroom bed state vector is generated based on harvesting imager images of the selected mushroom collected before harvesting of the selected mushroom using the selected one of the crop management tools;
the post-action mushroom bed state vector is generated based on harvesting imager images of the selected mushroom after harvesting of the selected mushroom using the selected one of the crop management tools; and
the desired outcome comprises a maximum degree of damage to a cap or stem of the selected mushroom.

11. The robotic mushroom crop manager of claim 10, wherein:
the desired outcome further comprises a maximum degree of damage to a cap or stem of other ones of the mushrooms adjacent the selected mushroom in the mushroom bed.

12. The robotic mushroom crop manager of claim 11, wherein:
the desired outcome further comprises a maximum degree of disturbance to growing medium in the mushroom bed adjacent the selected mushroom.

13. The robotic mushroom crop manager of claim 1, wherein:
at least some of the crop management tools comprise suction harvesters operable to apply suction to respective heads of at least some of the mushrooms to lift the mushrooms during harvesting.

14. An automated mushroom crop management system comprising:
a plurality of the robotic mushroom crop managers, each of the plurality of the robotic mushroom crop managers comprising:
at least one processor;
a communications interface; and
at least one computer-readable medium storing instructions executable by the at least one processor to cause the robotic mushroom crop manager:

to periodically or continuously receive mushroom bed data corresponding to a mushroom bed including growing mushrooms at a plurality of times;

to use a trained mushroom bed model to process the mushroom bed data to generate mushroom bed state vectors respectively characterizing corresponding states of the mushroom bed at the plurality of times;

to control crop management equipment to perform a crop management program comprising a sequence of actions to be performed by the crop management equipment comprising, for each current action in the sequence of actions, selecting, based on a corresponding current mushroom bed state vector, a selected crop management tool from a plurality of crop management tools, wherein selecting the selected crop management tool comprises:

accessing a selection library datastore storing predetermined tool selection data associating predetermined optimal ones of the plurality of crop management tools with respectively corresponding combinations of actions in the crop management program and preconfigured ranges of the mushroom bed state vectors;

for the current action, determining whether the selection library datastore stores predetermined tool selection data wherein the current mushroom bed state vector falls within one of the preconfigured ranges of the mushroom bed state vectors; and when, for the current action, the selection library datastore stores predetermined tool selection data wherein the current mushroom bed state vector falls within one of the preconfigured ranges of the mushroom bed state vectors, using as the selected crop management tool to perform the current action the optimal one of the plurality of crop management tools identified by the predetermined tool selection data;

when, for the current action, the selection library datastore is free from predetermined tool selection data wherein the current mushroom bed state vector falls within one of the preconfigured ranges of the mushroom bed state vectors, accessing a robotic mushroom crop manager (RMCM) list datastore storing records corresponding respectively to one or more other like robotic mushroom crop managers, each record storing an identifier and a communication address of the corresponding other like robotic mushroom crop manager, and selecting one of the other like robotic mushroom crop managers based on preconfigured selection parameters;

generating a tool selection request message encoding in association the current action and the current mushroom bed state vector, and using the communications interface to communicate the tool selection request message to the communication address of the selected one of the other like robotic mushroom crop managers;

when, for the current action, the robotic mushroom crop manager receives from the selected other like robotic mushroom manager a tool selection reply message corresponding to the tool selection request message encoding an optimal tool selection, using as the selected crop management tool to perform the current action the optimal one of the plurality of crop management tools identified by the tool selection reply message when, for the current action, the robotic mushroom crop manager does not receive from the selected other like robotic mushroom manager the tool selection reply message corresponding to the tool selection request message encoding an optimal tool selection within a preconfigured interval, generating a further tool selection request message encoding in association the current action and the current mushroom bed state vector, and using the communications interface to communicate the further tool selection request to a remote crop management tool coordinator; and when, for the current action, the robotic mushroom crop manager receives from the crop management tool coordinator a tool selection reply message corresponding to the further tool selection request message encoding an optimal tool selection, using as the selected crop management tool to perform the current action the optimal one of the plurality of crop management tools identified by the tool selection reply message to control the crop management equipment to use the selected crop management tool to perform the current action on the mushroom bed; and the remote crop management tool coordinator, wherein the crop management tool coordinator comprises:

at least one further processor;

a further communications interface; and at least one further computer-readable medium storing instructions executable by the at least one further processor to cause the crop management tool coordinator:

to use the further communications interface to receive the further tool selection request from a requesting robotic mushroom crop manager;

to access a further selection library datastore storing predetermined tool selection data associating predetermined optimal ones of the plurality of crop management tools with respectively corresponding actions in the crop management program and preconfigured ranges of the mushroom bed state vectors;

for the current action, to determine whether the further selection library datastore stores predetermined tool selection data wherein the current mushroom bed state vector falls within the preconfigured ranges of the mushroom bed state vectors; and when, for the current action, the further selection library datastore stores predetermined tool selection data wherein the current mushroom bed state vector falls within the preconfigured ranges of the mushroom bed state vectors, to generate the tool selection reply message encoding the optimal tool selection, and using the further communications interface to communicate the tool selection reply message to the requesting robotic mushroom crop manager.

15. The automated mushroom crop management system of claim 14, wherein the at least one further computer-readable medium further stores instructions executable by the at least one further processor to cause the crop management tool coordinator:

when, for the current action, the further selection library datastore does not store predetermined tool selection data wherein the current mushroom bed state vector falls within the preconfigured ranges of the mushroom bed state vectors, to use a further local trained tool selection model to generate the optimal tool selection based on the current mushroom bed state vector;

to generate the tool selection reply message encoding the optimal tool selection; and to use the further communications interface to communicate the tool selection reply message to the requesting robotic mushroom crop manager.

16. The automated mushroom crop management system of claim 15, wherein the at least one further computer-readable medium further stores instructions executable by the at least one further processor to cause the crop management tool coordinator:

to store in the further selection library datastore predetermined tool selection data associating the selected one of the plurality of crop management tools used to perform the current action on the mushroom bed with the current action and the pre-action mushroom bed state vector.

17. The automated mushroom crop management system of claim 16, wherein the at least one further computer-readable medium further stores instructions executable by the at least one further processor to cause the crop management tool coordinator:

to train the further local tool selection model based on the current action on the mushroom bed and the pre-action mushroom bed state vector.

* * * * *